United States Patent
Chen et al.

(10) Patent No.: US 12,223,398 B2
(45) Date of Patent: Feb. 11, 2025

(54) DATA SEQUENCE PREDICTION METHOD AND COMPUTING DEVICE

(71) Applicant: Huawei Technologies Co., Ltd., Shenzhen (CN)

(72) Inventors: Xinjie Chen, Shenzhen (CN); Jia Zeng, Hong Kong (CN); Di Chen, Shenzhen (CN); Fangzhou Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1084 days.

(21) Appl. No.: 17/038,635

(22) Filed: Sep. 30, 2020

(65) Prior Publication Data

US 2021/0012152 A1  Jan. 14, 2021

Related U.S. Application Data

(63) Continuation of application No. PCT/CN2019/084399, filed on Apr. 25, 2019.

(30) Foreign Application Priority Data

May 10, 2018  (CN) .......................... 201810445781.3

(51) Int. Cl.
G06N 20/00 (2019.01)
G06F 18/21 (2023.01)
G06F 18/213 (2023.01)
G06F 18/22 (2023.01)
G06F 18/23213 (2023.01)
(Continued)

(52) U.S. Cl.
CPC .......... *G06N 20/00* (2019.01); *G06F 18/213* (2023.01); *G06F 18/2163* (2023.01); *G06F 18/22* (2023.01); *G06F 18/23213* (2023.01); *G06F 18/2431* (2023.01); *G06F 18/251* (2023.01)

(58) Field of Classification Search
CPC ..... G06N 20/00; G06F 18/22; G06F 18/2163; G06F 18/23213; G06F 18/2431; G06F 18/251; G06F 18/213
See application file for complete search history.

(56) References Cited

FOREIGN PATENT DOCUMENTS

| | | |
|---|---|---|
| CN | 102999791 A | 3/2013 |
| CN | 104281891 A | 1/2015 |
| CN | 104834967 A | 8/2015 |

(Continued)

OTHER PUBLICATIONS

Brockwell, P., et al,. Introduction to time series and forecasting, Third Edition, Springer, 2016, 428 pages.

(Continued)

*Primary Examiner* — Mahelet Shiberou
(74) *Attorney, Agent, or Firm* — Conley Rose, P.C.

(57) ABSTRACT

A data sequence prediction method includes calculating, based on historical data sequences of N objects, a similarity distance between every two objects of the N objects, to obtain a similarity distance set, where the similarity distance is used to represent a similarity degree of two objects, the historical data sequence includes a plurality of pieces of data arranged according to a preset rule, and N is a positive integer greater than 1, dividing the N objects into K prediction object classes based on the similarity distance set using a clustering algorithm, where K is a positive integer, and K≤N, and predicting a future data sequence of an object included in at least one prediction object class of the K prediction object classes.

20 Claims, 8 Drawing Sheets

(51) Int. Cl.
*G06F 18/2431* (2023.01)
*G06F 18/25* (2023.01)

(56) References Cited

FOREIGN PATENT DOCUMENTS

| CN | 105956699 A | 9/2016 |
|----|-------------|--------|
| CN | 106778838 A | 5/2017 |
| CN | 106779147 A | 5/2017 |

OTHER PUBLICATIONS

Oracle, "Consumption within a Forecast Set," retrieved from the internet: https://docs.oracle.com/cd/A60725_05/html/comnls/us/mrp/consum01.htm#c_fconsex, Nov. 3, 2020, 1 page.

Gamboa, J., "Deep Learning for Time-Series Analysis," arXiv:1701.01887v1 [cs.LG], Jan. 7, 2017, 13 pages.

Jian-Wei, W., et al. "Online Sales vol. Prediction Based on Items Clustering," Software Technique Algorithm, vol. 25, No. 10, 2016, 17 pages. With English translation.

Hyndman, R., "Optimal combination forecasts for hierarchical time series," Computational Statistics and Data Analysis, 2011, vol. 55, No. 9, pp. 2579-2589.

Kahn, K., "Revisiting top-down versus bottom-up forecasting," The Journal of Business Forecasting, vol. 17, No. 2, 1998, pp. 14-19.

Data sequence prediction system

DATA SEQUENCE PREDICTION METHOD AND COMPUTING DEVICE

CROSS-REFERENCE TO RELATED APPLICATIONS

This application is a continuation of International Patent Application No. PCT/CN2019/084399, filed on Apr. 25, 2019, which claims priority to Chinese Patent Application No. 201810445781.3 filed on May 10, 2018, both of which are hereby incorporated by reference in their entireties.

TECHNICAL FIELD

The present disclosure relates to the field of big data technologies, and in particular, to a data sequence prediction method and a computing device.

BACKGROUND

Data sequence prediction of an object, for example, product demand prediction, refers to predicting a demand for each product (including a pick to order product, an assembled item, a purchased item, and the like), to guide advance processing of the pick to order product or the assembled item and advance purchase of the purchased item in order to ensure timely satisfaction of a customer demand. For some manufacturing companies, a pick to order product is assembled from an assembled item and a purchased item. There are fixed and non-fixed product hierarchical structures among the pick to order product, the assembled item, and the purchased item. A fixed product hierarchical structure is determined by a fixed product configuration list. For example, a power backplane required for a chassis (an assembled item) includes a fixed power connector, a resistor, and a capacitor. A non-fixed product hierarchical structure is determined by a customer order. For example, a 2 gigabyte (GB) memory or a 4 GB memory is selected for a server (a pick to order product) order.

The product demand prediction requires consideration of two aspects. One is a prediction accuracy rate, that is, a difference between a predicted demand value and a real demand value. The other one is prediction consistency. In an embodiment, a customer needs to purchase a pick to order product from a company through an order. As the pick to order product needs to be assembled from a series of assembled items and purchased items, it is necessary to ensure consistency between predicted values of the assembled items, the purchased items, and the pick to order product in order to avoid over-prediction of a kind of product (such as a first purchased item), which leaves a redundant first purchased item unused, or to avoid under-prediction of a kind of product, which affects production of the assembled items or the pick to order product and eventually affects deliver to order.

FIG. 1 is a schematic illustrative diagram of another approach to a data prediction method. To ensure consistent prediction between products, first, a prediction object class needs to be defined manually, to classify a pick to order product, an assembled item, and a purchased item based on a historical demand and a product hierarchical structure. Second, demands for products at a prediction layer within a same prediction object class are predicted, to output predicted demand values of the products at the prediction layer within the prediction object class. Further, disassembly or integration is performed based on a hierarchical structure between the products, and products at an adjustment layer within the prediction object class are adjusted to achieve consistency.

However, the foregoing data prediction method still requires manual definition of a corresponding prediction object class, which greatly reduces application convenience. When there is a large quantity of products, efficiency of manually classifying products is low.

SUMMARY

Embodiments of this application provide a data sequence prediction method to automatically define a prediction object class using a clustering algorithm, which is efficient and more accurate.

According to a first aspect, an embodiment of this application provides a data sequence prediction method, including calculating, by a computing device or a data sequence prediction based on historical data sequences of N objects, a similarity distance between every two objects of the N objects, to obtain a similarity distance set, dividing the N objects into K prediction object classes based on the similarity distance set using a clustering algorithm, and predicting a future data sequence of an object included in at least one prediction object class of the K prediction object classes, where the similarity distance is used to represent a similarity degree of two objects, the historical data sequence includes a plurality of pieces of data arranged according to a preset rule, N is a positive integer greater than 1, K is a positive integer, and K≤N.

Compared with manual definition of an object class in other approaches, in this embodiment of this application, a prediction object class is automatically defined using the clustering algorithm, which is efficient and more accurate.

It should be noted that the data sequence prediction method in the embodiments of this application may be performed by a computing device or a data sequence prediction system. The following descriptions are made using the computing device as an example.

In a possible implementation, an implementation of the calculating, by a computing device based on historical data sequences of N objects, a similarity distance between every two objects of the N objects, to obtain a similarity distance set may be calculating, by the computing device based on the historical data sequences of the N objects, a data similarity distance between every two objects of the N objects, calculating a layer similarity distance between every two objects of the N objects, and obtaining, based on the data similarity distance and the layer similarity distance between every two objects of the N objects, the similarity distance set, where any similarity distance in the similarity distance set includes a corresponding data similarity distance and a corresponding layer similarity distance.

The data similarity distance is used to represent a similarity degree between historical data sequences corresponding to two objects, and the layer similarity distance is used to represent a similarity degree between layers of two objects in a hierarchical structure.

In this embodiment of this application, a data similarity distance and a layer similarity distance between objects are used to represent the similarity distance, and classification based on the similarity distance is more accurate.

In another possible implementation, the similarity distance set includes a similarity distance between an object i and an object j.

The object i and the object j are any two objects in the N objects, and the similarity distance between the object i and the object j may be calculated using the following formula $$d(y_i, y_j) = \frac{2d_{cor}(y_i, y_j)}{1 + e^{-d_{dis}(y_i, y_j)}},$$

where $y_i$ is a historical data sequence of the object i, $y_j$ is a historical data sequence of the object j, $d_{cor}(y_i, y_j)$ is a data similarity distance between the object i and the object j, and $d_{dis}(y_i, y_j)$ is a layer similarity distance between the object i and the object j.

In still another possible implementation, a calculation formula of $d_{cor}(y_i, y_j)$ may be $$d_{cor}(y_i,y_j)=\sqrt{2(1-Cor(y_i,y_j))},$$

where $$Cor(y_i, y_j) = \frac{\sum_{t=1}^{Q}(y_{it} - \bar{y}_i)(y_{jt} - \bar{y}_j)}{\sqrt{\sum_{t=1}^{Q}(y_{it} - \bar{y}_i)^2}\sqrt{\sum_{t=1}^{Q}(y_{jt} - \bar{y}_j)^2}},$$

where $Cor(y_i, y_j)$ is a Pearson correlation value of the object i and the object j, $y_{it}$ is a $t^{th}$ piece of data in the historical data sequence of the object i, and $y_{jt}$ is a $t^{th}$ piece of data in the historical data sequence of the object j, where t is a positive integer, t≤Q, and Q is a quantity of pieces of data included in the historical data sequence of the object i, and is a positive integer.

In still another possible implementation, a hierarchical structure of the N objects is a tree structure, where $d_{dis}(y_i, y_j)$ is a difference between a layer to which a node position of the object i belongs in the tree structure and a layer to which a node position of the object j belongs in the tree structure.

In still another possible implementation, the first prediction object class is any prediction object class of the at least one prediction object class, and an implementation of predicting, by the computing device, a future data sequence of an object included in the first prediction object class may be calculating, by the computing device based on a historical data sequence of the object included in the first prediction object class, historical common data patterns of the first prediction object class, predicting, based on the historical common data patterns of the first prediction object class, a future data pattern of the first prediction object class, and predicting, based on the future data pattern of the first prediction object class and the historical data sequence of the object included in the first prediction object class, the future data sequence of the object included in the first prediction object class. The historical common data pattern of the first prediction object class is used to represent a common feature included in historical data sequences of all objects in the first prediction object class.

In this embodiment of this application, during prediction of future data sequences of objects in a same prediction object class, a historical data pattern is extracted, a future data pattern is predicted, and a future data sequence is restored based on the future data pattern. This improves consistency and accuracy of data sequence prediction.

In still another possible implementation, the first prediction object class includes M objects, where M≤N, M is a positive integer, a historical data sequence of each of the M objects includes T pieces of data, and T is a positive integer greater than 1, and an implementation of calculating, by the computing device based on a historical data sequence of the object included in the first prediction object class, historical common data patterns of the first prediction object class may be performing, by the computing device, singular value decomposition on an M×T matrix of historical data sequences of the M objects, to obtain a T×T first matrix, where an inverse matrix of the first matrix is an orthogonal matrix, and data in each row of the first matrix constitutes a historical data pattern, and extracting, from the first matrix, a first historical data pattern to an $L^{th}$ historical data pattern as the historical common data patterns of the first prediction object class, where L is a positive integer, and L≤T.

In this embodiment of this application, a method for solving a historical common data pattern is provided, to extract, from the historical data sequences of the N objects, historical common data patterns that can represent a common feature included in the historical data sequences of all the objects in the first prediction object class.

In still another possible implementation, a future data sequence of each of the M objects includes H pieces of data, where H is a positive integer, and a first implementation of the predicting, by the computing device based on the historical common data patterns of the first prediction object class, a future data pattern of the first prediction object class may be obtaining, by the computing device, H data pattern models through training based on the historical common data patterns of the first prediction object class, where a $k^{th}$ data pattern model in the H data pattern models is used to predict data in a $k^{th}$ column of a second matrix $\hat{V}$ of the future data pattern of the first prediction object class, k is a positive integer, k≤H, and the future data pattern of the first prediction object class is used to represent a common feature included in future data sequences of all objects in the first prediction object class, inputting data in a $T^{th}$ column to a $(T-p+1)^{th}$ column in a third matrix $V_1$ of the historical common data patterns of the first prediction object class into the $k^{th}$ data pattern model in the H data pattern models, to predict the data in the $k^{th}$ column of the second matrix $\hat{V}$, where p is a positive integer, 1<p<T, and each row of the third matrix $V_1$ constitutes a historical common data pattern, and combining data predicted using the H data pattern models, to obtain the second matrix $\hat{V}$, where data in each row of the second matrix $\hat{V}$ constitutes a future data pattern.

In this embodiment of this application, a manner for predicting a future data pattern based on a historical common data pattern is provided.

In still another possible implementation, a future data sequence of each of the M objects includes H pieces of data, where H is a positive integer, and a second implementation of the predicting, by the computing device based on the historical common data patterns of the first prediction object class, a future data pattern of the first prediction object class may be obtaining, by the computing device, a data pattern model based on the historical common data patterns of the first prediction object class, inputting data in a $(T-H+k)^{th}$ column to a $(T-H+k-p+1)^{th}$ column in a third matrix $V_1$ of the historical common data patterns of the first prediction object class into the data pattern model, to predict data in a $k^{th}$ column of a second matrix $\hat{V}$ of the future data pattern of the first prediction object class, where k and p are positive integers, k≤H, and T−H+k−p≥1, each row of the third matrix $V_1$ constitutes a historical common data pattern, and the future data pattern of the first prediction object class is used to represent a common feature included in future data sequences of all objects in the first prediction object class, and combining data predicted by sequentially setting k=1 to H, to obtain the second matrix $\hat{V}$, where data in each row of the second matrix $\hat{V}$ constitutes a future data pattern.

In this embodiment of this application, a manner for predicting a future data pattern based on a historical common data pattern is provided. In this manner, only one data pattern model needs to be trained, which greatly reduces model training and increases computational efficiency.

In still another possible implementation, the computing device performs singular value decomposition on the M×T matrix of the historical data sequences of the M objects, to further obtain an M×M fourth matrix U and an M×T fifth matrix D, where the fourth matrix U is an orthogonal matrix, and the fifth matrix D is a diagonal matrix, and an implementation of the predicting, by the computing device based on the future data pattern of the first prediction object class and the historical data sequence of the object included in the first prediction object class, the future data sequence of the object included in the first prediction object class may be $\hat{Y}=U_1 D_1 \hat{V}$, where $\hat{Y}$ is a matrix of the future data sequence of the object included in the first prediction object class, $U_1$ is a matrix of data in a first column to an $L^{th}$ column of the fourth matrix U, and $D_1$ is a matrix of data in a first column to an $L^{th}$ column of a first row to an $L^{th}$ row of the fifth matrix D.

In this embodiment of this application, a method for predicting a future data sequence of an object based on a future data pattern is provided, which is convenient and efficient.

In still another possible implementation, a value on a diagonal of the fifth matrix D acting as a diagonal matrix decreases as a quantity of rows increases, and L may be selected as a quantity of elements in the fifth matrix D that are greater than a preset threshold in order to reduce computational complexity by reducing a quantity of historical data patterns.

According to a second aspect, an embodiment of this application provides a computing device, including a distance calculation unit configured to calculate, based on historical data sequences of N objects, a similarity distance between every two objects of the N objects, to obtain a similarity distance set, where the similarity distance is used to represent a similarity degree of two objects, the historical data sequence includes a plurality of pieces of data arranged according to a preset rule, and N is a positive integer greater than 1, an object classification unit configured to divide the N objects into K prediction object classes based on the similarity distance set using a clustering algorithm, where K is a positive integer, and K≤N, and a prediction unit configured to predict a future data sequence of an object included in at least one prediction object class of the K prediction object classes.

In a possible implementation, the distance calculation unit is further configured to calculate, based on the historical data sequences of the N objects, a data similarity distance between every two objects of the N objects, where the data similarity distance is used to represent a similarity degree between historical data sequences corresponding to two objects, calculate a layer similarity distance between every two objects of the N objects, where the layer similarity distance is used to represent a similarity degree between layers of two objects in a hierarchical structure, and obtain, based on the data similarity distance and the layer similarity distance between every two objects of the N objects, the similarity distance set, where any similarity distance in the similarity distance set includes a corresponding data similarity distance and a corresponding layer similarity distance.

In still another possible implementation, an object i and an object j are any two objects in the N objects, and a similarity distance between the object i and the object j is calculated using the following formula $$d(y_i, y_j) = \frac{2d_{cor}(y_i, y_j)}{1 + e^{-d_{dis}(y_i, y_j)}},$$

where $y_i$ is a historical data sequence of the object i, $y_j$ is a historical data sequence of the object j, $d_{cor}(y_i, y_j)$ is a data similarity distance between the object i and the object j, and $d_{dis}(y_i, y_j)$ is a layer similarity distance between the object i and the object j.

In still another possible implementation, a calculation formula of $d_{cor}(y_i, y_j)$ is $$d_{cor}(y_i,y_j)=\sqrt{2(1-Cor(y_i,y_j))},$$

where $$Cor(y_i, y_j) = \frac{\sum_{k=1}^{Q} (y_{it} - \bar{y}_i)(y_{jt} - \bar{y}_j)}{\sqrt{\sum_{k=1}^{Q} (y_{it} - \bar{y}_i)^2} \sqrt{\sum_{k=1}^{Q} (y_{jt} - \bar{y}_j)^2}},$$

where $Cor((y_i, y_j)$ is a Pearson correlation value of the object i and the object j, $y_{it}$ is a $t^{th}$ piece of data in the historical data sequence of the object i, and $y_{jt}$ is a $t^{th}$ piece of data in the historical data sequence of the object j, where t is a positive integer, t≤Q, and Q is a quantity of pieces of data included in the historical data sequence of the object i, and is a positive integer.

Optionally, a hierarchical structure of the N objects is a tree structure, where $d_{dis}(y_i, y_j)$ is a difference between a layer to which a node position of the object i belongs in the tree structure and a layer to which a node position of the object j belongs in the tree structure.

In still another possible implementation, the first prediction object class is any prediction object class of the at least one prediction object class, and that the prediction unit is configured to predict a future data sequence of an object included in the first prediction object class is further calculating, based on a historical data sequence of the object included in the first prediction object class, historical common data patterns of the first prediction object class, where the historical common data pattern of the first prediction object class is used to represent a common feature included in historical data sequences of all objects in the first prediction object class, predicting, based on the historical common data patterns of the first prediction object class, a future data pattern of the first prediction object class, and predicting, based on the future data pattern of the first prediction object class and the historical data sequence of the object included in the first prediction object class, the future data sequence of the object included in the first prediction object class.

In still another possible implementation, the first prediction object class includes M objects, where M≤N, M is a positive integer, a historical data sequence of each of the M objects includes T pieces of data, and T is a positive integer greater than 1, and that the prediction unit calculates, based on a historical data sequence of the object included in the first prediction object class, historical common data patterns of the first prediction object class includes performing singular value decomposition on an M×T matrix of historical data sequences of the M objects, to obtain a T×T first matrix, where an inverse matrix of the first matrix is an orthogonal matrix, and data in each row of the first matrix constitutes a historical data pattern, and extracting, from the first matrix, a first historical data pattern to an $L^{th}$ historical data pattern as the historical common data patterns of the first prediction object class, where L is a positive integer, and L≤T.

In still another possible implementation, a future data sequence of each of the M objects includes H pieces of data, where H is a positive integer, and that the prediction unit predicts, based on the historical common data patterns of the first prediction object class, a future data pattern of the first prediction object class includes obtaining H data pattern models through training based on the historical common data patterns of the first prediction object class, where a $k^{th}$ data pattern model in the H data pattern models is used to predict data in a $k^{th}$ column of a second matrix $\hat{V}$ of the future data pattern of the first prediction object class, k is a positive integer, k≤H, and the future data pattern of the first prediction object class is used to represent a common feature included in future data sequences of all objects in the first prediction object class, inputting data in a $T^{th}$ column to a $(T-p+1)^{th}$ column in a third matrix $V_1$ of the historical common data patterns of the first prediction object class into the $k^{th}$ data pattern model in the H data pattern models, to predict the data in the $k^{th}$ column of the second matrix $\hat{V}$, where p is a positive integer, 1<p<T, and each row of the third matrix $V_1$ constitutes a historical common data pattern, and combining data predicted using the H data pattern models, to obtain the second matrix $\hat{V}$, where data in each row of the second matrix $\hat{V}$ constitutes a future data pattern.

In still another possible implementation, a future data sequence of each of the M objects includes H pieces of data, where H is a positive integer, and that the prediction unit predicts, based on the historical common data patterns of the first prediction object class, a future data pattern of the first prediction object class includes obtaining a data pattern model through training based on the historical common data patterns of the first prediction object class, inputting data in a $(T-H+k)^{th}$ column to a $(T-H+k-p+1)^{th}$ column in a third matrix $V_1$ of the historical common data patterns of the first prediction object class into the data pattern model, to predict data in a $k^{th}$ column of a second matrix $\hat{V}$ of the future data pattern of the first prediction object class, where k and p are positive integers, k≤H, and T−H+k−p≥1, each row of the third matrix $V_1$ constitutes a historical common data pattern, and the future data pattern of the first prediction object class is used to represent a common feature included in future data sequences of all objects in the first prediction object class, and combining data predicted by sequentially setting k=1 to H, to obtain the second matrix $\hat{V}$, where data in each row of the second matrix $\hat{V}$ constitutes a future data pattern.

In still another possible implementation, the prediction unit is configured to perform singular value decomposition on the M×T matrix of the historical data sequences of the M objects, to further obtain an M×M fourth matrix U and an M×T fifth matrix D, where the fourth matrix U is an orthogonal matrix, and the fifth matrix D is a diagonal matrix, and the predicting, by the prediction unit based on the future data pattern of the first prediction object class and the historical data sequence of the object included in the first prediction object class, the future data sequence of the object included in the first prediction object class further includes $\hat{Y}=U_1 D_1 \hat{V}$, where $\hat{Y}$ is a matrix of the future data sequence of the object included in the first prediction object class, $U_1$ is a matrix of data in a first column to an $L^{th}$ column of the fourth matrix U, and $D_1$ is a matrix of data in a first column to an $L^{th}$ column of a first row to an $L^{th}$ row of the fifth matrix D.

In still another possible implementation, a value on a diagonal of the fifth matrix D acting as a diagonal matrix decreases as a quantity of rows increases, and L may be selected as a quantity of elements in the fifth matrix D that are greater than a preset threshold in order to reduce computational complexity by reducing a quantity of historical data patterns.

According to a third aspect, an embodiment of this application further provides a computing device, including a processor and a memory, where the processor is connected to the memory, and the processor is configured to call program code stored in the memory to calculate, based on historical data sequences of N objects, a similarity distance between every two objects of the N objects, to obtain a similarity distance set, where the similarity distance is used to represent a similarity degree of two objects, the historical data sequence includes a plurality of pieces of data arranged according to a preset rule, and N is a positive integer greater than 1, divide the N objects into K prediction object classes based on the similarity distance set using a clustering algorithm, where K is a positive integer, and K≤N, and predict a future data sequence of an object included in at least one prediction object class of the K prediction object classes.

In a possible implementation, the calculating, by the processor based on historical data sequences of N objects, a similarity distance between every two objects of the N objects, to obtain a similarity distance set includes calculating, based on the historical data sequences of the N objects, a data similarity distance between every two objects of the N objects, where the data similarity distance is used to represent a similarity degree between historical data sequences corresponding to two objects, calculating a layer similarity distance between every two objects of the N objects, where the layer similarity distance is used to represent a similarity degree between layers of two objects in a hierarchical structure, and obtaining, based on the data similarity distance and the layer similarity distance between every two objects of the N objects, the similarity distance set, where any similarity distance in the similarity distance set includes a corresponding data similarity distance and a corresponding layer similarity distance.

In another possible implementation, an object i and an object j are any two objects in the N objects, and a similarity distance between the object i and the object j is calculated using the following formula $$d(y_i, y_j) = \frac{2 d_{cor}(y_i, y_j)}{1 + e^{-d_{dis}(y_i, y_j)}},$$

where $y_i$ is a historical data sequence of the object i, $y_j$ is a historical data sequence of the object j, $d_{cor}(y_i, y_j)$ is a data similarity distance between the object i and the object j, and $d_{dis}(y_i, y_j)$ is a layer similarity distance between the object i and the object j.

In still another possible implementation, a calculation formula of $d_{cor}(y_i, y_j)$ is $$d_{cor}(y_i, y_j) = \sqrt{2(1 - Cor(y_i, y_j))},$$

where $$Cor(y_i, y_j) = \frac{\sum_{k=1}^{Q}(y_{it}-\bar{y}_i)(y_{jt}-\bar{y}_j)}{\sqrt{\sum_{k=1}^{Q}(y_{it}-\bar{y}_i)^2}\sqrt{\sum_{k=1}^{Q}(y_{jt}-\bar{y}_j)^2}},$$

where $Cor(y_i, y_j)$ is a Pearson correlation value of the object i and the object j, $y_{it}$ is a $t^{th}$ piece of data in the historical data sequence of the object i, and $y_{jt}$ is a $t^{th}$ piece of data in the historical data sequence of the object j, where t is a positive integer, t≤Q, and Q is a quantity of pieces of data included in the historical data sequence of the object i, and is a positive integer.

In still another possible implementation, a hierarchical structure of the N objects is a tree structure, where $d_{dis}(y_i, y_j)$ is a difference between a layer to which a node position of the object i belongs in the tree structure and a layer to which a node position of the object j belongs in the tree structure.

In still another possible implementation, the first prediction object class is any prediction object class of the at least one prediction object class, and the predicting, by the processor, a future data sequence of an object included in the first prediction object class includes calculating, based on a historical data sequence of the object included in the first prediction object class, historical common data patterns of the first prediction object class, where the historical common data pattern of the first prediction object class is used to represent a common feature included in historical data sequences of all objects in the first prediction object class, predicting, based on the historical common data patterns of the first prediction object class, a future data pattern of the first prediction object class, and predicting, based on the future data pattern of the first prediction object class and the historical data sequence of the object included in the first prediction object class, the future data sequence of the object included in the first prediction object class.

In still another possible implementation, the first prediction object class includes M objects, where M≤N, M is a positive integer, a historical data sequence of each of the M objects includes T pieces of data, and T is a positive integer greater than 1, and the calculating, by the processor based on a historical data sequence of the object included in the first prediction object class, historical common data patterns of the first prediction object class includes performing singular value decomposition on an M×T matrix of historical data sequences of the M objects, to obtain a T×T first matrix, where an inverse matrix of the first matrix is an orthogonal matrix, and data in each row of the first matrix constitutes a historical data pattern, and extracting, from the first matrix, a first historical data pattern to an $L^{th}$ historical data pattern as the historical common data patterns of the first prediction object class, where L is a positive integer, and L≤T.

In still another possible implementation, a future data sequence of each of the M objects includes H pieces of data, where H is a positive integer, and the predicting, by the processor based on the historical common data patterns of the first prediction object class, a future data pattern of the first prediction object class includes obtaining H data pattern models through training based on the historical common data patterns of the first prediction object class, where a $k^{th}$ data pattern model in the H data pattern models is used to predict data in a $k^{th}$ column of a second matrix $\hat{V}$ of the future data pattern of the first prediction object class, k is a positive integer, k≤H, and the future data pattern of the first prediction object class is used to represent a common feature included in future data sequences of all objects in the first prediction object class, inputting data in a $T^{th}$ column to a $(T-p+1)^{th}$ column in a third matrix $V_1$ of the historical common data patterns of the first prediction object class into the $k^{th}$ data pattern model in the H data pattern models, to predict the data in the $k^{th}$ column of the second matrix $\hat{V}$, where p is a positive integer, 1<p<T, and each row of the third matrix $V_1$ constitutes a historical common data pattern, and combining data predicted using the H data pattern models, to obtain the second matrix $\hat{V}$, where data in each row of the second matrix $\hat{V}$ constitutes a future data pattern.

In still another possible implementation, a future data sequence of each of the M objects includes H pieces of data, where H is a positive integer, and the predicting, by the processor based on the historical common data patterns of the first prediction object class, a future data pattern of the first prediction object class includes obtaining a data pattern model through training based on the historical common data patterns of the first prediction object class, inputting data in a $(T-H+k)^{th}$ column to a $(T-H+k-p+1)^{th}$ column in a third matrix $V_1$ of the historical common data patterns of the first prediction object class into the data pattern model, to predict data in a $k^{th}$ column of a second matrix $\hat{V}$ of the future data pattern of the first prediction object class, where k and p are positive integers, k≤H, and T−H+k−p≥1, each row of the third matrix $V_1$ constitutes a historical common data pattern, and the future data pattern of the first prediction object class is used to represent a common feature included in future data sequences of all objects in the first prediction object class, and combining data predicted by sequentially setting k=1 to H, to obtain the second matrix $\hat{V}$, where data in each row of the second matrix $\hat{V}$ constitutes a future data pattern.

In still another possible implementation, the processor performs singular value decomposition on the M×T matrix of the historical data sequences of the M objects, to further obtain an M×M fourth matrix U and an M×T fifth matrix D, where the fourth matrix U is an orthogonal matrix, and the fifth matrix D is a diagonal matrix, and the predicting, based on the future data pattern of the first prediction object class and the historical data sequence of the object included in the first prediction object class, the future data sequence of the object included in the first prediction object class further includes $\hat{Y}=U_1D_1\hat{V}$, where $\hat{Y}$ is a matrix of the future data sequence of the object included in the first prediction object class, $U_1$ is a matrix of data in a first column to an $L^{th}$ column of the fourth matrix U, and $D_1$ is a matrix of data in a first column to an $L^{th}$ column of a first row to an $L^{th}$ row of the fifth matrix D.

In still another possible implementation, a value on a diagonal of the fifth matrix D acting as a diagonal matrix decreases as a quantity of rows increases, and L may be selected as a quantity of elements in the fifth matrix D that are greater than a preset threshold in order to reduce computational complexity by reducing a quantity of historical data patterns.

According to a fourth aspect, an embodiment of the present disclosure further provides a data sequence prediction system, where the data sequence prediction system includes but is not limited to a distance calculation module configured to calculate, based on historical data sequences of N objects, a similarity distance between every two objects of the N objects, to obtain a similarity distance set, where the similarity distance is used to represent a similarity degree of two objects, the historical data sequence includes a plurality of pieces of data arranged according to a preset rule, and N is a positive integer greater than 1, an object classification module configured to divide the N objects into K prediction object classes based on the similarity distance set using a clustering algorithm, where K is a positive integer, and K≤N, and a prediction module configured to predict a future data sequence of an object included in at least one prediction object class of the K prediction object classes.

Optionally, the data sequence prediction system may further include a data input module and/or a result output module. The data input module is configured to receive data, and convert the data into a data format required by the prediction module, where the data may include the historical data sequences of the N objects. The result output module is configured to output a prediction result of the prediction module.

In a possible implementation, the distance calculation module is further configured to calculate, based on the historical data sequences of the N objects, a data similarity distance between every two objects of the N objects, where the data similarity distance is used to represent a similarity degree between historical data sequences corresponding to two objects, calculate a layer similarity distance between every two objects of the N objects, where the layer similarity distance is used to represent a similarity degree between layers of two objects in a hierarchical structure, and obtain, based on the data similarity distance and the layer similarity distance between every two objects of the N objects, the similarity distance set, where any similarity distance in the similarity distance set includes a corresponding data similarity distance and a corresponding layer similarity distance.

In another possible implementation, an object i and an object j are any two objects in the N objects, and a similarity distance between the object i and the object j is calculated using the following formula $$d(y_i, y_j) = \frac{2d_{cor}(y_i, y_j)}{1 + e^{-d_{dis}(y_i, y_j)}},$$

where $y_i$ is a historical data sequence of the object i, $y_j$ is a historical data sequence of the object j, $d_{cor}(y_i, y_j)$ is a data similarity distance between the object i and the object j, and $d_{dis}(y_i, y_j)$ is a layer similarity distance between the object i and the object j.

In still another possible implementation, a calculation formula of $d_{cor}(y_i, y_j)$ is $$d_{cor}((y_i, y_j) = \sqrt{2(1 - Cor(y_i, y_j))},$$

where $$Cor(y_i, y_j) = \frac{\sum_{t=1}^{Q}(y_{it} - \bar{y}_i)(y_{jt} - \bar{y}_j)}{\sqrt{\sum_{t=1}^{Q}(y_{it} - \bar{y}_i)^2}\sqrt{\sum_{t=1}^{Q}(y_{jt} - \bar{y}_j)^2}},$$

where $Cor(y_i, y_j)$ is a Pearson correlation value of the object i and the object j, $y_{it}$ is a $t^{th}$ piece of data in the historical data sequence of the object i, and $y_{jt}$ is a $t^{th}$ piece of data in the historical data sequence of the object j, where t is a positive integer, t≤Q, and Q is a quantity of pieces of data included in the historical data sequence of the object i, and is a positive integer.

Optionally, a hierarchical structure of the N objects is a tree structure, where $d_{dis}(y_i, y_j)$ is a difference between a layer to which a node position of the object i belongs in the tree structure and a layer to which a node position of the object j belongs in the tree structure.

In still another possible implementation, a first prediction object class is any prediction object class of the at least one prediction object class, and that the prediction module is configured to predict a future data sequence of an object included in the first prediction object class includes calculating, based on a historical data sequence of the object included in the first prediction object class, historical common data patterns of the first prediction object class, where the historical common data pattern of the first prediction object class is used to represent a common feature included in historical data sequences of all objects in the first prediction object class, predicting, based on the historical common data patterns of the first prediction object class, a future data pattern of the first prediction object class, and predicting, based on the future data pattern of the first prediction object class and the historical data sequence of the object included in the first prediction object class, the future data sequence of the object included in the first prediction object class.

In still another possible implementation, the first prediction object class includes M objects, where M≤N, M is a positive integer, a historical data sequence of each of the M objects includes T pieces of data, and T is a positive integer greater than 1, and that the prediction module calculates, based on a historical data sequence of the object included in the first prediction object class, historical common data patterns of the first prediction object class includes performing singular value decomposition on an M×T matrix of historical data sequences of the M objects, to obtain a T×T first matrix, where an inverse matrix of the first matrix is an orthogonal matrix, and data in each row of the first matrix constitutes a historical data pattern, and extracting, from the first matrix, a first historical data pattern to an $L^{th}$ historical data pattern as the historical common data patterns of the first prediction object class, where L is a positive integer, and L≤T.

In still another possible implementation, a future data sequence of each of the M objects includes H pieces of data, where H is a positive integer, and that the prediction module predicts, based on the historical common data patterns of the first prediction object class, a future data pattern of the first prediction object class includes obtaining H data pattern models through training based on the historical common data patterns of the first prediction object class, where a $k^{th}$ data pattern model in the H data pattern models is used to predict data in a $k^{th}$ column of a second matrix $\hat{V}$ of the future data pattern of the first prediction object class, k is a positive integer, k≤H, and the future data pattern of the first prediction object class is used to represent a common feature included in future data sequences of all objects in the first prediction object class, inputting data in a $T^{th}$ column to a $(T-p+1)^{th}$ column in a third matrix $V_1$ of the historical common data patterns of the first prediction object class into the $k^{th}$ data pattern model in the H data pattern models, to predict the data in the $k^{th}$ column of the second matrix $\hat{V}$, where p is a positive integer, 1<p<T, and each row of the third matrix $V_1$ constitutes a historical common data pattern, and combining data predicted using the H data pattern models, to obtain the second matrix $\hat{V}$, where data in each row of the second matrix $\hat{V}$ constitutes a future data pattern.

In still another possible implementation, a future data sequence of each of the M objects includes H pieces of data, where H is a positive integer, and that the prediction module predicts, based on the historical common data patterns of the first prediction object class, a future data pattern of the first prediction object class includes obtaining a data pattern model through training based on the historical common data patterns of the first prediction object class, inputting data in a $(T-H+k)^{th}$ column to a $(T-H+k-p+1)^{th}$ column in a third matrix $V_1$ of the historical common data patterns of the first prediction object class into the data pattern model, to predict data in a $k^{th}$ column of a second matrix $\hat{V}$ of the future data pattern of the first prediction object class, where k and p are positive integers, k≤H, and T-H+k-p≥1, each row of the third matrix $V_1$ constitutes a historical common data pattern, and the future data pattern of the first prediction object class is used to represent a common feature included in future data sequences of all objects in the first prediction object class, and combining data predicted by sequentially setting k=1 to H, to obtain the second matrix $\hat{V}$, where data in each row of the second matrix $\hat{V}$ constitutes a future data pattern.

In still another possible implementation, the prediction module is configured to perform singular value decomposition on the M×T matrix of the historical data sequences of the M objects, to further obtain an M×M fourth matrix U and an M×T fifth matrix D, where the fourth matrix U is an orthogonal matrix, and the fifth matrix D is a diagonal matrix, and the predicting, by the prediction module based on the future data pattern of the first prediction object class and the historical data sequence of the object included in the first prediction object class, the future data sequence of the object included in the first prediction object class further includes $\hat{Y}=U_1 D_1 \hat{V}$, where $\hat{Y}$ is a matrix of the future data sequence of the object included in the first prediction object class, $U_1$ is a matrix of data in a first column to an $L^{th}$ column of the fourth matrix U, and $D_1$ is a matrix of data in a first column to an $L^{th}$ column of a first row to an $L^{th}$ row of the fifth matrix D.

In still another possible implementation, a value on a diagonal of the fifth matrix D acting as a diagonal matrix decreases as a quantity of rows increases, and L may be selected as a quantity of elements in the fifth matrix D that are greater than a preset threshold in order to reduce computational complexity by reducing a quantity of historical data patterns.

According to a fifth aspect, an embodiment of the present disclosure further provides a computer storage medium, where the computer storage medium is used to store a computer software instruction, and when the computer software instruction is executed by a computer, the computer is enabled to perform any data sequence prediction method according to the first aspect.

According to a sixth aspect, an embodiment of the present disclosure further provides a computer program, where the computer program includes a computer software instruction, and when the instruction is executed by a computer, the computer is enabled to perform any data sequence prediction method according to the first aspect.

In summary, in the embodiments of this application, the similarity distance between every two objects of the N objects is calculated based on the historical data sequences of the N objects, to obtain the similarity distance set, where the similarity distance is used to represent a similarity degree of two objects, further, the N objects are divided into the K prediction object classes based on the similarity distance set using the clustering algorithm, and then the future data sequence of the object included in the at least one prediction object class of the K prediction object classes is predicted. When the embodiments of the present disclosure are implemented, a prediction object class is automatically defined using the clustering algorithm, which is efficient and more accurate.

Moreover, during prediction of future data sequences of objects in a same prediction object class, a historical data pattern is extracted, a future data pattern is predicted, and a future data sequence is restored based on the future data pattern. This improves consistency and accuracy of data sequence prediction.

BRIEF DESCRIPTION OF DRAWINGS

To describe the technical solutions in the embodiments of the present disclosure or in other approaches more clearly, the following briefly describes the accompanying drawings required for describing the embodiments or previous approaches.

DESCRIPTION OF EMBODIMENTS

Figure 1:
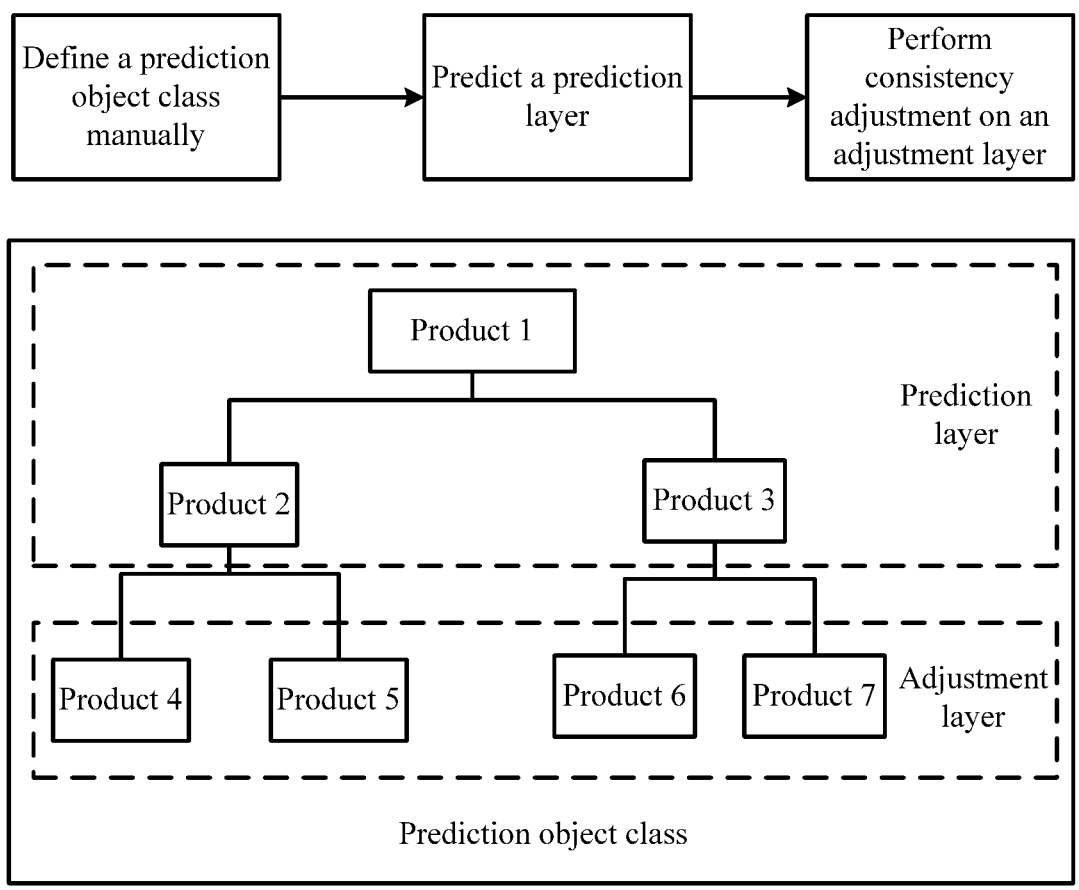
FIG. 1 is a schematic illustrative diagram of a data prediction method in other approaches.

The following clearly and completely describes the technical solutions in other approaches or the embodiments of the present disclosure with reference to the accompanying drawings.

The following describes concepts and terms used in the embodiments of the present disclosure.

In the embodiments of this application, there are a plurality of objects. As a research object in the embodiments of this application, the object may be a sold or purchased object (such as a product), or may be another object, which is not limited in the embodiments of this application. Optionally, there may be a hierarchical structure between the plurality of objects, and the hierarchical structure may be a tree structure.

In the embodiments of this application, the tree structure means that there is a "one-to-many" correspondence between objects. The tree structure may represent a hierarchical relationship between the objects.

A data sequence is a plurality of pieces of data arranged according to a preset rule. Optionally, the data sequence may be a plurality of pieces of data arranged in a chronological order.

A historical data sequence is a data sequence that has been obtained.

A future data sequence is a to-be-predicted data sequence.

It should be understood that for data sequences arranged in a chronological order, the historical data sequence may be a data sequence before a first time point, and the future data sequence may be a data sequence after the first time point.

A similarity distance represents a similarity degree between historical data of two objects. A smaller similarity distance means a greater possibility of being classified into a same object class.

A clustering algorithm may be a distance-based clustering algorithm, which divides a plurality of object sets into different classes or clusters such that a similarity between objects in a same class is as high as possible, and a difference between objects that are not in a same class are as large as possible.

An object class is a set of a plurality of products that are in a specific relationship. In the embodiments of this application, the object class is a class into which a plurality of objects are grouped based on historical data sequences of the plurality of objects using a clustering algorithm.

In consistency prediction, for a same object class, a hierarchical relationship between objects in each object class is considered in order to ensure consistency of prediction data of each object class.

A fixed hierarchical structure means that one object corresponds to one or more fixed objects. For example, there is a fixed production configuration list for an assembled item. For example, if a power backplane required for a chassis includes a fixed power connector, a resistor, and a capacitor, there is a fixed hierarchical structure between the chassis and the power connector, the resistor and the capacitor.

A non-fixed hierarchical structure means that one object corresponds to one or more non-fixed objects. For example, if a 2 GB memory or a 4 GB memory is selected for a server order, there is a non-fixed hierarchical structure between the server and the 2 GB memory or the 4 GB memory.

A diagonal matrix is a matrix in which all values except diagonal values are 0.

An autoregressive integrated moving average model (ARIMA) is a time sequence prediction method proposed by Box and Jenkins, and is a model established by converting a non-stationary time sequence into a stationary time sequence and then performing regression on a hysteresis value of a dependent variable and a present value and a hysteresis value of a random error term.

The following describes a scenario to which a data sequence prediction method of this application may be applied.

The data sequence prediction method of the present disclosure can be used for prediction when there are a plurality of time sequences and there is a specific relationship between the sequences, for example, demand prediction of multiple products of a supply chain, or power prediction in multiple regions (municipalities and subordinate districts). The following describes an application scenario of the data sequence prediction method of this application using demand prediction of multiple products in a tree structure as an example.

Figure 2:
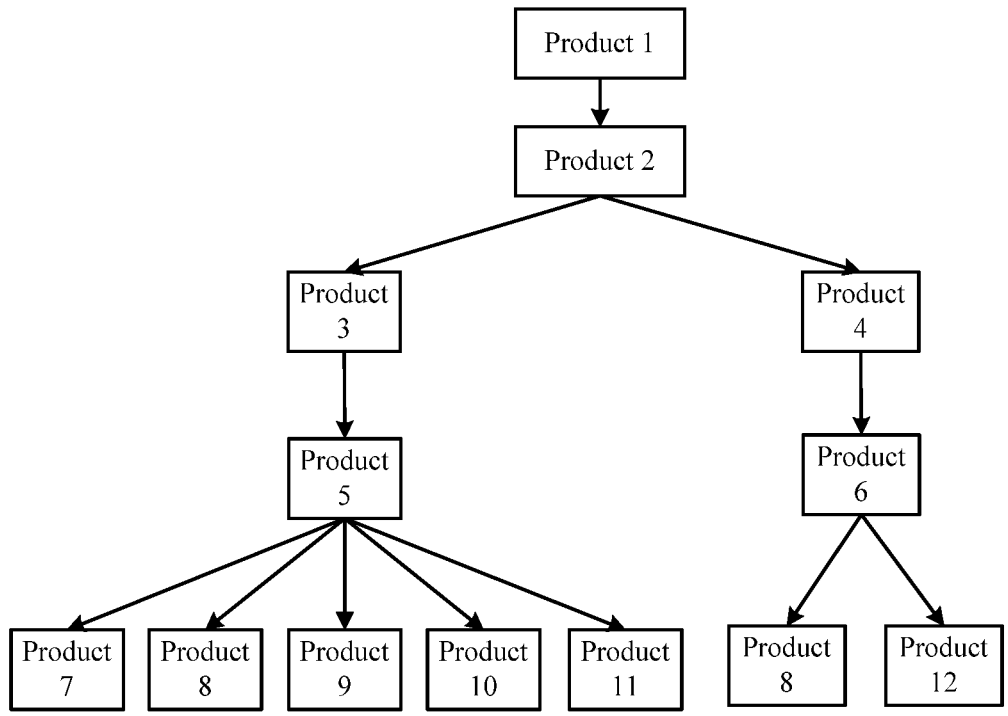
FIG. 2 is a schematic illustrative diagram of a product hierarchical structure according to an embodiment of this application.

FIG. 2 is a schematic illustrative diagram of a product hierarchical structure according to an embodiment of this application.

Pick to order is a complete product for direct sales, such as a server or a computer. The pick to order product may be a product 1 in FIG. 2.

Assembled item is a middleware that needs to be processed by a factory. The assembled item may be a product 2, a product 3, a product 4, a product 5, or a product 6 in FIG. 2.

Purchased item is a product obtained directly through purchase. The purchased item may be a product 7, a product 8, a product 9, a product 10, a product 11, or a product 12 in FIG. 2.

Figure 3:
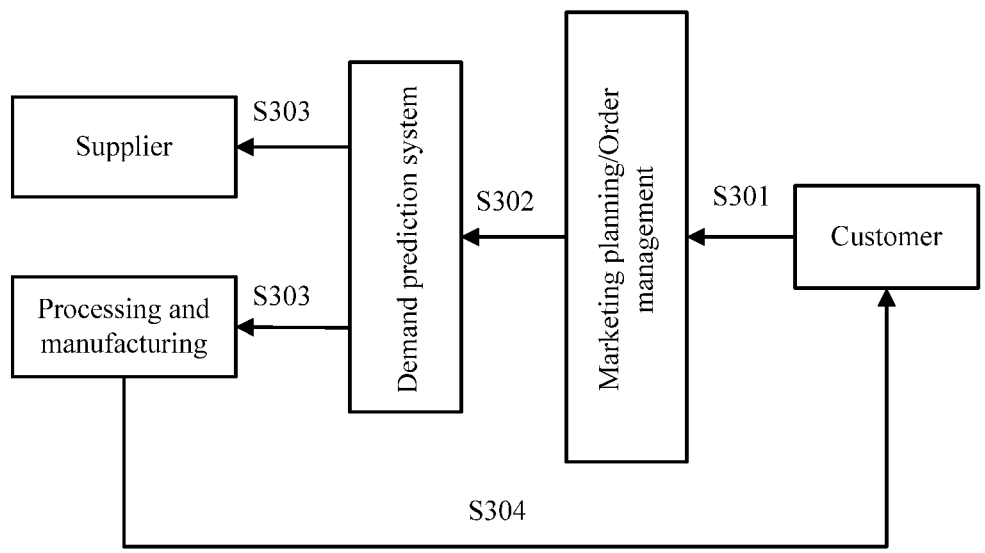
FIG. 3 is a schematic diagram of an application scenario of a data sequence prediction method according to an embodiment of this application.

An application scenario diagram in FIG. 3 shows a function of the data sequence prediction method of this application in fulfilling customer demands in an enterprise. Due to limitation to a procurement cycle and a production cycle of a purchased item and an assembled item, advance reservation through demand prediction is required to match a customer's demand cycle and fulfill the customer's demand on schedule. The basic steps are as follows.

Step S301. The customer transfers demand information (such as order information) to a marketing planning or order management department.

Step S302. The market planning or order management department inputs related historical and future order information into a demand prediction system.

Step S303. The demand prediction system predicts a future demand for a product such as a purchase item and an assembled item, and transfers a predicted demand value of the purchased item to a supplier for purchase, and transfers a predicted demand value of the assembled item to a factory for processing and manufacturing in advance.

Step S304. The factory performs processing and manufacturing, and fulfills the order to deliver the product to the customer.

For the method for predicting a future demand by the demand prediction system, refer to the related description in the following data sequence prediction method embodiments. Details are not described in this embodiment of this application.

Figure 4:
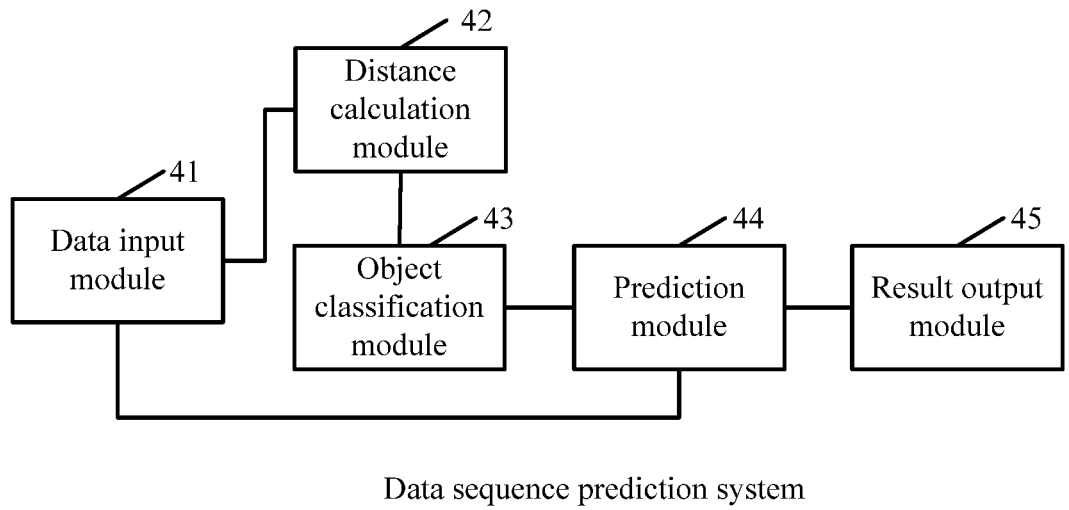
FIG. 4 is a schematic architectural diagram of a data sequence prediction system according to an embodiment of this application.

FIG. 4 is a schematic architectural diagram of a data sequence prediction system according to an embodiment of this application. The data sequence prediction system may be applied to one or more computing devices. The data sequence prediction system may include a data input module 41 configured to receive data, and convert the data into a data format required by a prediction module, where the data may include historical data sequences of N objects, a distance calculation module 42 configured to calculate, based on the historical data sequences of the N objects, a similarity distance between every two objects of the N objects, to obtain a similarity distance set, where the similarity distance is used to represent a similarity degree of two objects, the historical data sequence includes a plurality of pieces of data arranged according to a preset rule, and N is a positive integer greater than 1, an object classification module 43 configured to divide the N objects into K prediction object classes based on the similarity distance set using a clustering algorithm, where K is a positive integer, and K≤N, the prediction module 44 configured to predict, based on the historical data sequences of the N objects, a future data sequence of an object included in at least one prediction object class of the K prediction object classes, and a result output module 45 configured to output a prediction result of the prediction module.

It should be noted that although the data input module 41 and the result output module 45 are shown in FIG. 4, the data input module 41 and/or the result output module 45 are not mandatory components of the data prediction system.

It should also be noted that the data sequence prediction system can be applied to various scenarios. For example, the foregoing demand prediction system is an expression form of the data sequence prediction system in a product demand prediction scenario. The foregoing modules may be separately disposed in computing devices, or may be disposed in a same computing device, which is not limited in this embodiment of this application. For specific implementation of a function of each module or unit, refer to related description in the following data sequence prediction method embodiments. Details are not described herein.

The following describes a data sequence prediction method in the present disclosure. The method can be applied to the foregoing data prediction system, or be applied to one or more computing devices. This embodiment of this application is described using an example in which the data sequence prediction method is applied to one computing device.

It should be understood that, in this embodiment of this application, each object corresponds to one historical data sequence, and the historical data sequence includes a plurality of pieces of data arranged according to a preset rule.

Optionally, the preset rule may be chronological order, and the data sequence is formed by objects over time. The historical data sequence is a plurality of pieces of data generated by an object in chronological order before a first time point. The future data sequence is one or more pieces of data arranged by a predicted object in chronological order after the first time point.

For example, the object is a product, and a historical data sequence of the object is a monthly demanded quantity of the product in each month of the last year. The data sequence prediction method is applied to product demand prediction, and can predict a monthly demanded quantity of each product in each month of a period of future time. It can be understood that there may be a structural hierarchy between products. For example, refer to the schematic illustrative diagram of the product hierarchical structure shown in FIG. 2.

For another example, the object is a region, the region may be any province, city, county, district, and the like in China, and a historical data sequence is wattage of power required per day in the past month. The data sequence prediction method is applied to power demand prediction, and can predict daily demanded wattage in each region in a period of future time. It can be understood that there is a fixed hierarchical structure between regions. One province may include a plurality of cities, and one city may include a plurality of districts, counties, and the like.

It should be noted that a historical data sequence of an object may be alternatively based on another rule, which is not limited in this embodiment of the present disclosure.

Figure 5:
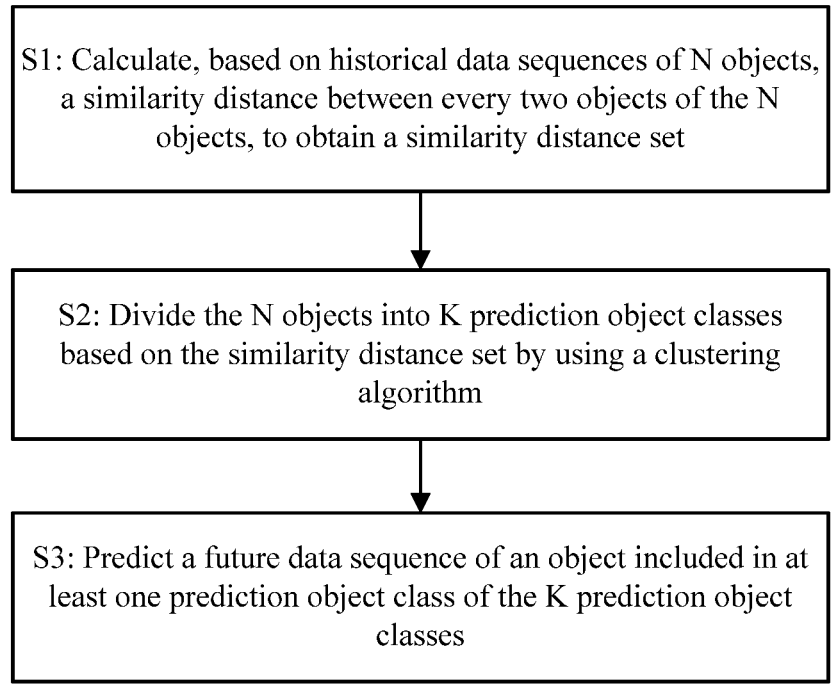
FIG. 5 is a schematic flowchart of a data sequence prediction method according to an embodiment of this application.

FIG. 5 is a schematic flowchart of a data sequence prediction method according to an embodiment of this application. The data sequence prediction method includes but is not limited to some or all of the following steps.

Step S1. Calculate, based on historical data sequences of N objects, a similarity distance between every two objects of the N objects, to obtain a similarity distance set.

The similarity distance is used to represent a similarity degree between two objects, the historical data sequence includes a plurality of pieces of data arranged according to a preset rule, and N is a positive integer greater than 1.

It can be understood that the similarity distance set may include $N(N-1)/2$ similarity distance values.

An object i and an object j are any two different objects of the N objects, where i and j are positive integers, $i \leq N$, $j \leq N$, and $i \neq j$. The similarity distance set includes a similarity distance between the object i and the object j.

A historical data sequence of the object i may be expressed as $y_i = [y_{i1}\ y_{i2}\ \ldots\ y_{iT}]$ A historical data sequence of the object j may be expressed as $y_j = [y_{j1}\ y_{j2}\ \ldots\ y_{jT}]$.

T is a positive integer greater than 1.

In this embodiment of the present disclosure, the similarity distance between the object i and the object j may be expressed in the following two manners.

A first expression manner.

There is a hierarchical structure between the N objects. The similarity distance between the object i and the object j, $d(y_i, y_j)$, may be expressed by a data similarity distance $d_{cor}(y_i, y_j)$ and a layer similarity distance $d_{dis}(y_i, y_j)$. Specifically, a computing device calculates, based on the historical data sequences of the N objects, a data similarity distance between every two objects of the N objects, calculates a layer similarity distance between every two objects of the N objects, and further obtains, based on the data similarity distance and the layer similarity distance between every two objects of the N objects, the similarity distance set, where any similarity distance in the similarity distance set includes a corresponding data similarity distance and a corresponding layer similarity distance. The data similarity distance is used to represent a similarity degree between historical data sequences corresponding to two objects, and the layer similarity distance is used to represent a similarity degree between layers of two objects in the hierarchical structure.

Optionally, an implementation of calculating the similarity distance between the object i and the object j by the computing device may be as follows.

The data similarity distance between the object i and the object j may be expressed as $$d_{cor}(y_i, y_j) = \sqrt{2(1 - Cor(y_i, y_j))} \quad (1)$$

where, in formula (1), $Cor(y_i, y_j)$ is a Pearson correlation value of the first object and the second object, and $Cor(y_i, y_j)$ may be expressed as $$Cor(y_i, y_j) = \frac{\sum_{t=1}^{T}(y_{it} - \bar{y}_i)(y_{jt} - \bar{y}_j)}{\sqrt{\sum_{t=1}^{T}(y_{it} - \bar{y}_i)^2}\sqrt{\sum_{t=1}^{T}(y_{jt} - \bar{y}_j)^2}} \quad (2)$$

where $y_{it}$ is a $t^{th}$ piece of data in the historical data sequence of the object i, $y_{jt}$ is a $t^{th}$ piece of data in the historical data sequence of the object j, t is a positive integer, and $t \leq T$.

Optionally, the hierarchical structure of the N objects is a tree structure, and the layer similarity distance between the object i and the object j, $d_{dis}(y_i, y_j)$ may be a difference between a layer to which a node position of the object i belongs in the tree structure and a layer to which a node position of the object j belongs in the tree structure.

As shown in FIG. 4, a layer similarity distance between a product 1 and a product 2 is 1, and a layer similarity distance between the product 1 and a product 3 is 2.

Further, the layer similarity distance between the object i and the object j may be expressed as $$d(y_i, y_j) = f(d_{dis}(y_i, y_j) * d_{cor}(y_i, y_j)) \quad (3)$$

where $$f(x) = \frac{2}{1+e^{-x}},$$

i and j are positive integers and i≤N, j≤N, and i≠j.

A second expression manner.

There may be no hierarchical structure between the N objects, or there may be a hierarchical structure between the N objects, but the hierarchical structure may be not considered in calculating the similarity distance. The similarity distance between the object i and the object j may be expressed by only the data similarity distance $d_{cor}(y_i, y_j)$.

$$d(y_i, y_j) = d_{cor}(y_i, y_j) \quad (4)$$

For calculation of the data similarity distance between the object i and the object j, $d_{cor}(y_i, y_j)$, refer to the related description in the first expression manner. Details are not described again in this embodiment of the present disclosure.

It should be understood that the similarity distance set may be obtained using the foregoing solution of the similarity distance between the object i and the object j.

Step S2. Divide the N objects into K prediction object classes based on the similarity distance set using a clustering algorithm, where K is a positive integer, and K≤N.

Figure 6:
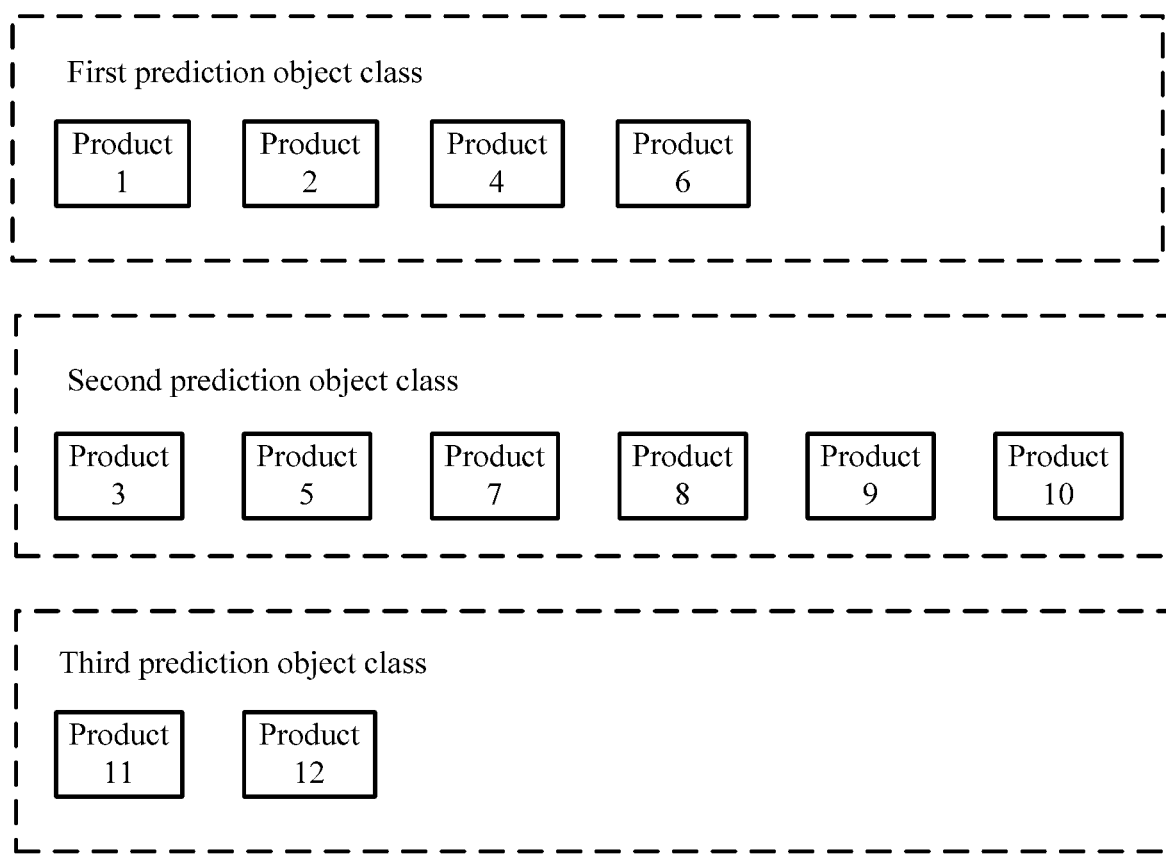
FIG. 6 is a schematic illustrative diagram of a prediction object class according to an embodiment of this application.

For example, the product hierarchical structure shown in FIG. 3 is divided into three prediction object classes shown in FIG. 6 after clustering such that objects with similar similarity distances are divided into a same prediction object class. There are a first prediction object class, a second prediction object class, and a third prediction object class.

In this embodiment of the present disclosure, the clustering algorithm determines, based on a similarity distance between objects, a class to which an object belongs. The clustering algorithm may include but is not limited to K-means clustering algorithm, K-median clustering algorithm, K-center point clustering algorithm K-center, a spectral clustering algorithm, density-based clustering algorithm, and the like.

The foregoing clustering algorithm may be used to divide the N objects into the K prediction object classes. The clustering algorithm is used in prior approaches, which is not described in this embodiment of the present disclosure.

A prediction object class A is any prediction class of the K prediction object classes, and an object f is any object in the prediction object class A. Generally, a similarity distance between the object f and an object in the prediction object class A is smaller than a similarity distance between the object f and an object not in the prediction object class A.

Step S3. Predict a future data sequence of an object included in at least one prediction object class of the K prediction object classes.

The first prediction object class is any prediction object class of the at least one prediction object class. The first prediction object class includes M objects, where M≤N, and M is a positive integer.

Figure 7:
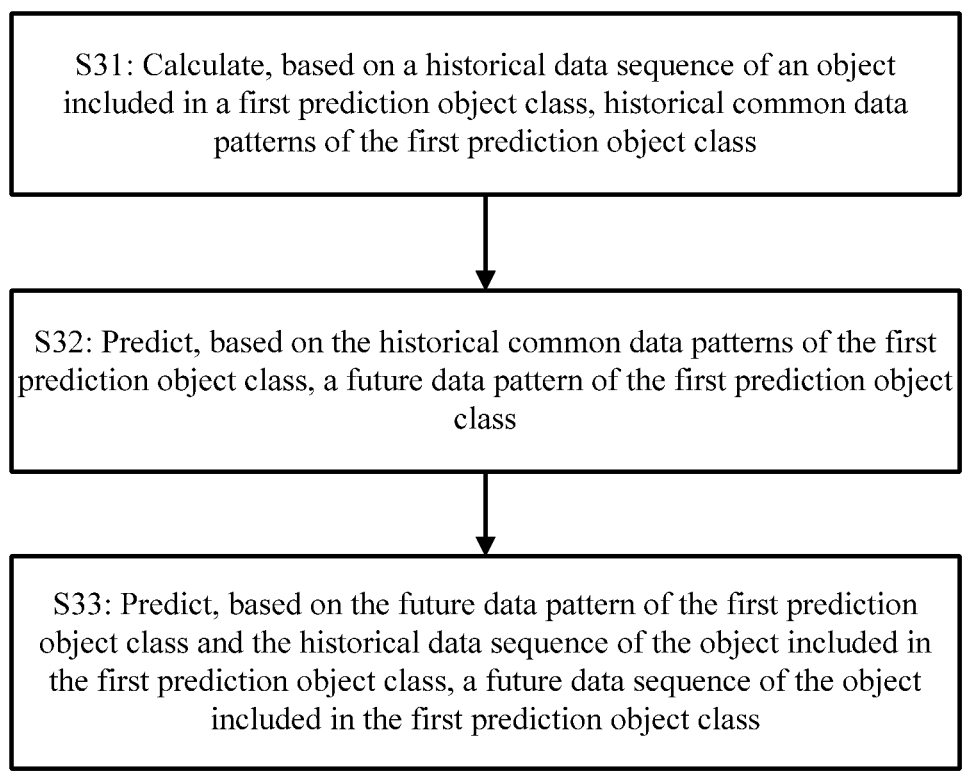
FIG. 7 is a schematic flowchart of a method for predicting a future data sequence of an object in a first prediction object class according to an embodiment of this application.

In an embodiment of this application, FIG. 7 is a schematic flowchart of a method for predicting a future data sequence of the object in the first prediction object class. The method may include the following steps.

Step S31. Calculate historical common data patterns of the first prediction object class based on a historical data sequence of the object included in the first prediction object class.

Step S32. Predict a future data pattern of the first prediction object class based on the historical common data patterns of the first prediction object class.

Step S33. Predict the future data sequence of the object included in the first prediction object class based on the future data pattern of the first prediction object class and the historical data sequence of the object included in the first prediction object class.

Optionally, an implementation of step S31 may be as follows.

Historical data sequences of the M objects can constitute an M×T matrix Y. Through singular value decomposition on the M×T matrix Y, a T×T first matrix V, an M×M fourth matrix U, and an M×T fifth matrix D can be obtained, that is, $$Y = UDV \quad (5)$$

where elements in each row of the matrix Y represent a historical data sequence of an object. Y may be expressed as $$Y = \begin{bmatrix} y_{11} & y_{12} & \cdots & y_{1t} \\ y_{21} & y_{22} & \cdots & y_{2t} \\ \vdots & \vdots & \ddots & \vdots \\ y_{m1} & y_{m2} & \cdots & y_{mt} \end{bmatrix}.$$

An inverse matrix of the first matrix, $V^{-1}$, is an orthogonal matrix, and elements in each row of the first matrix V represent a historical data pattern. Any historical data pattern is a data sequence of T pieces of data, and V may be expressed as $$V = \begin{bmatrix} v_{11} & v_{12} & \cdots & v_{1L} & \cdots & v_{1T} \\ v_{21} & v_{22} & \cdots & v_{2L} & \cdots & v_{2T} \\ \vdots & \vdots & \ddots & \vdots & \ddots & \vdots \\ v_{L1} & v_{L2} & \cdots & v_{LL} & \cdots & v_{LT} \\ \vdots & \vdots & \ddots & \vdots & \ddots & \vdots \\ v_{T1} & v_{T2} & \cdots & v_{TL} & \cdots & v_{TT} \end{bmatrix}.$$

The fifth matrix D is a diagonal matrix, and if L<T<M, D may be expressed as $$D = \begin{bmatrix} d_{11} & 0 & \cdots & 0 & \cdots & 0 \\ 0 & d_{22} & \cdots & 0 & \cdots & 0 \\ \vdots & \vdots & \ddots & \vdots & \ddots & \vdots \\ 0 & 0 & \cdots & d_{LL} & \cdots & 0 \\ \vdots & \vdots & \ddots & \vdots & \ddots & \vdots \\ 0 & 0 & \cdots & 0 & \cdots & d_{TT} \\ \vdots & \vdots & \ddots & \vdots & \ddots & \vdots \\ 0 & 0 & 0 & 0 & 0 & 0 \end{bmatrix}.$$

A value on a diagonal of the fifth matrix D, $d_{ii}$, represents a weight of an $i^{th}$ historical data pattern. $d_{11}$ is a largest value of values on diagonals of the diagonal matrix D obtained through the singular value decomposition. A value of $d_{ii}$ on the diagonal decreases as i increases.

The pattern data matrix U is an orthogonal matrix, and U may be expressed as $$U = \begin{bmatrix} u_{11} & u_{12} & \cdots & u_{1L} & \cdots & u_{1T} & \cdots & u_{1M} \\ u_{21} & u_{22} & \cdots & u_{2L} & \cdots & u_{2T} & \cdots & u_{2M} \\ \vdots & \vdots & \ddots & \vdots & \ddots & \vdots & \ddots & \vdots \\ u_{L1} & u_{L2} & \cdots & u_{LL} & \cdots & u_{LT} & \cdots & u_{LM} \\ \vdots & \vdots & \ddots & \vdots & \ddots & \vdots & \ddots & \vdots \\ u_{T1} & u_{T2} & \cdots & u_{TL} & \cdots & u_{TT} & \cdots & u_{TM} \\ \vdots & \vdots & \ddots & \vdots & \ddots & \vdots & \ddots & \vdots \\ u_{M1} & u_{M2} & \cdots & u_{ML} & \cdots & u_{MT} & \cdots & u_{MM} \end{bmatrix}.$$

Elements in an $i^{th}$ row of the fourth matrix U represent a value of an $i^{th}$ object of the M objects in each historical data pattern.

In this embodiment of the present disclosure, T≤M is used as an example for description. It can be known from formula (5) that $$y_{ij} = \Sigma_{k=1}^{T} u_{ik} d_{kk} v_{kj} \tag{6}$$

In other words, a $j^{th}$ piece of data in the historical data sequence of the $i^{th}$ object of the M objects is a weight value of a $j^{th}$ piece of data extracted from each of the historical data patterns. Overall importance of a historical data pattern is determined by D, and importance of different objects is further determined by the pattern data matrix U.

Not all historical data patterns are shared by objects in a prediction object class. Only some important historical data patterns represent historical common data patterns in the prediction object class. Because the value on the diagonal of the fifth matrix D, $d_{ii}$, decreases as i increases, historical data patterns of a first row to an $L^{th}$ row of the first matrix may be selected as the historical common data patterns. In this case, the first matrix may be expressed as $$y_{ij} \approx \Sigma_{k=1}^{L} u_{ik} d_{kk} v_{kj} \tag{7}$$

It can be understood that the historical common data pattern reflects a common feature implied in all objects of the first prediction object class. Each element in a historical data sequence of any object of the first prediction object class may be represented as a linear superposition of historical common data patterns.

Optionally, a value on the diagonal of the fifth matrix D acting as a diagonal matrix decreases as a quantity of rows increases, and L may be selected as a quantity of elements in the fifth matrix D that are greater than a preset threshold in order to reduce computational complexity by reducing a quantity of historical data patterns.

Optionally, the selected L historical data patterns may constitute a third matrix. In addition, elements in the first L columns in the pattern data matrix U are extracted to constitute a matrix $U_1$, and elements in a first column to an $L^{th}$ column of a first row to an $k^{th}$ row of the fifth matrix D are extracted to constitute a matrix $D_1$. As shown in FIG. 2, $U_1$, $D_1$, and $V_1$ may be expressed as $$U_1 = \begin{bmatrix} u_{11} & u_{12} & \cdots & u_{1L} \\ u_{21} & u_{22} & \cdots & u_{2L} \\ \vdots & \vdots & \ddots & \vdots \\ u_{M1} & u_{M2} & \cdots & u_{ML} \end{bmatrix},$$

$$D_1 = \begin{bmatrix} d_{11} & 0 & \cdots & 0 \\ 0 & d_{22} & \cdots & 0 \\ \vdots & \vdots & \ddots & \vdots \\ 0 & 0 & \cdots & d_{LL} \end{bmatrix}.$$

Third matrix $$V_1 = \begin{bmatrix} v_{11} & v_{12} & \cdots & v_{1T} \\ v_{21} & v_{22} & \cdots & v_{2T} \\ \vdots & \vdots & \ddots & \vdots \\ v_{L1} & v_{L2} & \cdots & v_{LT} \end{bmatrix}.$$

It should be noted that if T≤M, L≤T, and if T>M, L≤M. Expressions of Y, U, D, and V in the case of T>M are similar to expressions of Y, U, D, and V in the case of T≤M, and details are not described again in this embodiment of the present disclosure.

It should also be noted that L may be equal to M. In this embodiment of the present disclosure, alternatively, the first matrix V may be directly used as the third matrix, the fourth matrix U is used as the matrix $U_1$, and the fifth matrix D is used as the matrix $D_1$.

When a to-be-predicted future data sequence is H pieces of data after a historical data sequence, a future data pattern of the first prediction object class may be predicted based on a historical data pattern of the first prediction object class. The future data pattern of the first prediction object class is used to represent a common feature included in future data sequences of all objects in the first prediction object class. A second matrix of the future data pattern of the first prediction object class may be expressed as $$\hat{V} = \begin{bmatrix} \hat{v}_{1,T+1} & \hat{v}_{1,T+2} & \cdots & \hat{v}_{1,T+H} \\ \hat{v}_{2,T+1} & \hat{v}_{2,T+2} & \cdots & \hat{v}_{2,T+H} \\ \vdots & \vdots & \ddots & \vdots \\ \hat{v}_{L,T+1} & \hat{v}_{L,T+2} & \cdots & \hat{v}_{L,T+H} \end{bmatrix}.$$

A column vector $v_r$ of data in an $i^{th}$ column of the third matrix $V_1$ may be expressed as $$v_r = [v_{1,r}, v_{2,r}, \ldots, v_{L,r}],$$

where r is a positive integer, and r≤T.

A column vector $\hat{v}_{T+k}$ of data in a $k^{th}$ column of the predicted second matrix $\hat{V}$ may be expressed as $$\hat{v}_{T+k} = [\hat{v}_{1,T+k}, \hat{v}_{2,T+k}, \ldots, \hat{v}_{L,T+k}],$$

where k is a positive integer, and k≤H.

Figure 8:
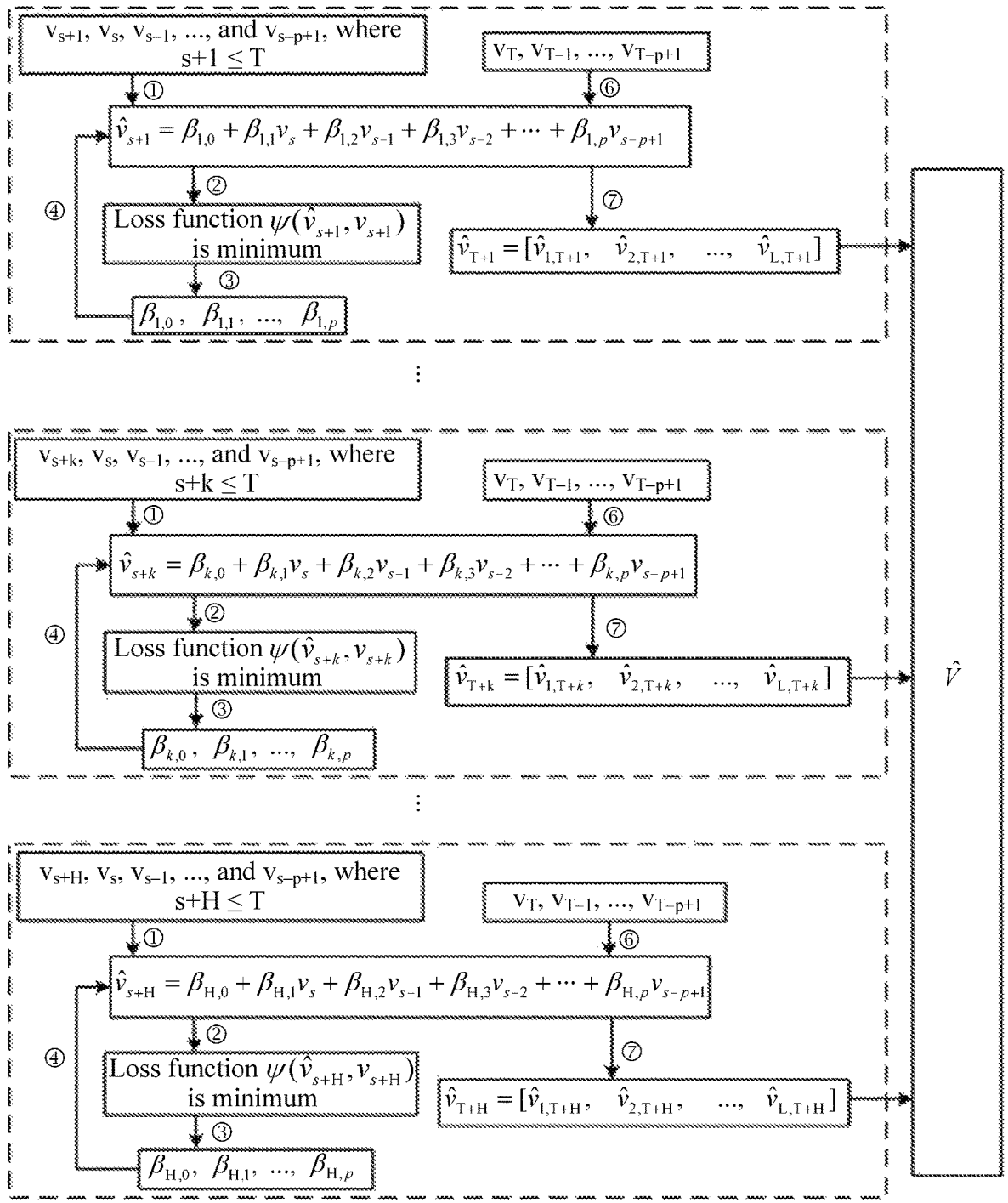
FIG. 8 is a schematic diagram of a first principle for predicting a future data pattern based on historical common data patterns according to an embodiment of this application.

Optionally, FIG. 8 is a schematic diagram of a first principle for predicting a future data pattern based on historical common data patterns. The computing device can obtain H data pattern models through training based on the historical common data pattern of the first prediction object class, where a $k^{th}$ data pattern model in the H data pattern models is used to predict data in the $k^{th}$ column of the second matrix $\hat{V}$ of the future data pattern of the first prediction object class, input data in a $T^{th}$ column to a $(T-p+1)^{th}$ column of the third matrix $V_1$ of the historical common data patterns of the first prediction object class into the $k^{th}$ data pattern model of the H data pattern models, to predict the data in the $k^{th}$ column of the second matrix $\hat{V}$, where p is a positive integer, 1<p<T, and each row of the third matrix $V_1$ constitutes a historical common data pattern, and further, combine data predicted using the H data pattern models, to obtain the second matrix $\hat{V}$, where data in each row of the second matrix $\hat{V}$ constitutes a future data pattern.

Specifically, an implementation of step S32 may include the following steps.

Step S321. Establish an initial model.

The initial model may be a linear weighted model or an autoregressive model. The initial model may be expressed as $$\hat{v}_{s+k} = \beta_{k,0} + \beta_{k,1} v_s + \beta_{k,2} v_{s-1} + \beta_{k,3} v_{s-2} + \cdots + \beta_{k,p} v_{s-p+1}.$$

It should be understood that the initial model may be in another form, which is not limited in this embodiment of this application.

Step S322. Train the initial model using a first part of data in the historical common data patterns to obtain a data pattern model.

Specifically, $v_s$, $v_{s-1}$, ..., and $v_{s-p+1}$ in the third matrix $V_1$ are substituted into the initial model to construct $\psi(\hat{v}_{s+k}, v_{s+k})$, a loss function about $v_{s+k}$ and parameters $\hat{v}_{s+k}$, $\beta_{k,0}$, $\beta_{k,1}$, ..., and $\beta_{k,p}$ in the initial model are determined by minimizing the loss function, and further, the data pattern model is obtained by substituting the determined parameters into the initial model. The loss function may be a quadratic loss function, and the parameters in the initial model may be calculated using a least square method, a gradient descent method, or the like, which are not limited in this embodiment of this application.

The first part of data in the historical common data patterns is sample data. The first part of data is $v_s$, $v_{s-1}$, ..., and $v_{s-p+1}$, where s+k≤T, p is a positive integer, and p≤s.

Step S323. Substitute a second part of data in the historical common data patterns into the data pattern model to obtain the future data pattern.

The second part of data in the historical common data patterns is test data. The second part of data is $v_T$, $v_{T-1}$, ..., and $v_{T-p+1}$ It can be understood that, according to the foregoing method, the H data pattern models can be obtained by setting k=1 to H.

When k=1, a first data pattern model is obtained through training on the initial model. The first data pattern model is $$\hat{v}_{s+1} = \beta_{1,0} + \beta_{1,1} v_s + \beta_{1,2} v_{s-1} + \beta_{1,3} v_{s-2} + \cdots + \beta_{1,p} v_{s-p+1}.$$

Where $\hat{v}_{T+1}$ can be obtained by inputting historical data $v_T$, $v_{T-1}$, ..., and $v_{T-p+i1}$ into the first data pattern model.

$$\hat{v}_{T+1} = [\hat{v}_{1,T+1}, \hat{v}_{2,T+1}, \ldots \hat{v}_{L,T+1}].$$

When k=2, a second data pattern model is obtained through training on the initial model. The second data pattern model is $$\hat{v}_{s+2} = \beta_{2,0} + \beta_{2,1} v_s + \beta_{2,2} v_{s-1} + \beta_{2,3} v_{s-2} + \cdots + \beta_{2,p} v_{s-p+1}.$$

Where $\hat{v}_{T+2}$ can be obtained by inputting the historical data $v_T$, $v_{T-1}$, ..., and $v_{T-p+1}$ into the second data pattern model.

$$\hat{v}_{T+2} = [\hat{v}_{1,T+2}, \hat{v}_{2,T+2}, \ldots, \hat{v}_{L,T+2}].$$

By analogy, when k=H, an $H^{th}$ data pattern model can be obtained through training on the initial model. The $H^{th}$ data pattern model is $$\hat{v}_{s+H} = \beta_{H,0} + \beta_{H,1} v_s + \beta_{H,2} v_{s-1} + \beta_{H,3} v_{s-2} + \cdots + \beta_{H,p} v_{s-p+1}.$$

Where $\hat{v}_{T+H}$ can be obtained by inputting the historical data $v_T$, $v_{T-1}$, ..., and $v_{T-p+1}$ into the second data pattern model.

$$\hat{v}_{T+H} = [\hat{v}_{1,T+H}, \hat{v}_{2,T+H}, \ldots, \hat{v}_{L,T+H}].$$

Further, a future matrix of a predicted future data pattern is obtained $$\hat{V} = \begin{bmatrix} \hat{v}_{1,T+1} & \hat{v}_{1,T+2} & \ldots & \hat{v}_{1,T+H} \\ \hat{v}_{2,T+1} & \hat{v}_{2,T+2} & \ldots & \hat{v}_{2,T+H} \\ \vdots & \vdots & \ddots & \vdots \\ \hat{v}_{L,T+1} & \hat{v}_{L,T+2} & \ldots & \hat{v}_{L,T+H} \end{bmatrix},$$

where each row of the predicted future data pattern $\hat{V}$ is a future data pattern.

Figure 9:
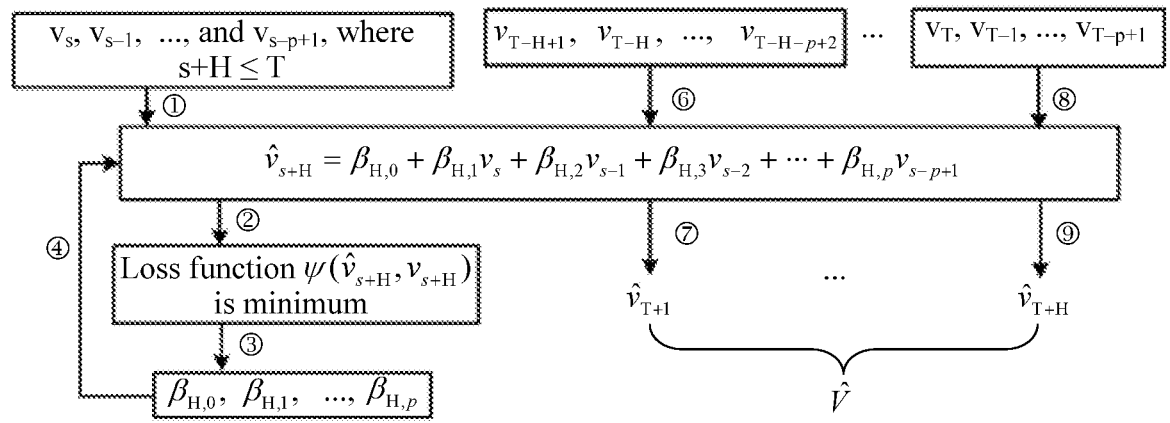
FIG. 9 is a schematic diagram of a second principle for predicting a future data pattern based on historical common data patterns according to an embodiment of this application.

Optionally, FIG. 9 is a schematic diagram of a second principle for predicting a future data pattern based on historical common data patterns. The computing device can obtain a data pattern model through training based on the historical common data patterns of the first prediction object class, input data in a $(T-H+k)^{th}$ column to a $(T-H+k-p+1)'$ column in the third matrix $V_1$ of the historical common data patterns of the first prediction object class into the data pattern model, to predict data in the $k^{th}$ column of the second matrix $\hat{V}$ of a future data pattern of the first prediction object class, where k and p are positive integers, k≤H, T−H+k−p≥1, and each row of the third matrix $V_1$ constitutes a historical common data pattern, and further, combine data predicted by setting k=1 to H, to obtain the second matrix $\hat{V}$, where data in each row of the second matrix $\hat{V}$ constitutes a future data pattern.

Specifically, another implementation of step S32 may be as follows.

Step S324. Establish a first initial model.

The first initial model may be a linear weighted model or an autoregressive model. The first initial model may be expressed as $$\hat{v}_{s+H} = \beta_{H,0} + \beta_{H,1} v_s + \beta_{H,2} v_{s-1} + \beta_{H,3} v_{s-2} + \cdots + \beta_{H,p} v_{s-p+1}.$$

Step S325. Train the initial model using a third part of data in the historical common data patterns to obtain a data pattern model.

Specifically, $v_s$, $v_{s-1}$, ..., and $v_{s-p+1}$ in a historical common pattern matrix are substituted into the first initial model to construct $\psi(\hat{v}_{s-H}, v_{s+H})$, a loss function about $v_{s+H}$ and $\hat{v}_{s+H}$, parameters $\beta_{H,0}$, $\beta_{H,1}$, ..., $\beta_{H,p}$ and in the initial model are determined by minimizing the loss function, and further, the determined parameters are substituted into the first initial model to obtain the data pattern model. The loss function may be a quadratic loss function, and the parameters in the first initial model may be calculated using a least square method, a gradient descent method, or the like, which are not limited in this embodiment of this application.

The third part of data in the historical common data patterns is sample data. The third part of data is $v_s$, $v_{s-1}$, ..., and $v_{s-p+1}$, where s+H≤T, p is a positive integer, and p≤s.

Step S326. Substitute a fourth part of data in the historical common data patterns into the data pattern model to obtain the future data pattern.

$v_{T-k+1}$, $v_{T-k}$, ..., and $v_{T-p+2-k}$ in the third matrix $V_1$ may be substituted into the data pattern model to calculate $\hat{v}_{T+k}$, where k is a positive integer, and k≤H.

Specifically, $\hat{v}_{T+H}$ can be obtained by substituting $v_T v_{T-1} \ldots v_{T-p+1}$ into the data pattern model, $\hat{v}_{T+H-1}$ can be obtained by substituting $v_{T-1} v_{T-2} \ldots v_{T-p}$ into the data pattern model, and by analogy, $\hat{v}_{T+1}$ can be obtained by substituting $v_{T-H+1} v_{T-H} \ldots v_{T-H-p+2}$ into the data pattern model.

Further, $\hat{v}_{T+k}$ is combined to obtain the second matrix $\hat{V}$ $$\hat{V} = \begin{bmatrix} \hat{v}_{1,t+1} & \hat{v}_{1,T+2} & \cdots & \hat{v}_{1,T+H} \\ \hat{v}_{2,T+1} & \hat{v}_{2,T+2} & \cdots & \hat{v}_{2,T+H} \\ \vdots & \vdots & \ddots & \vdots \\ \hat{v}_{L,T+1} & \hat{v}_{L,T+2} & \cdots & \hat{v}_{L,T+H} \end{bmatrix}.$$

It should be understood that the fourth matrix $\hat{V}$ includes L future data patterns, and elements in each row of the future pattern matrix $\hat{V}$ represents a future data pattern.

In this embodiment of the present disclosure, only one data pattern model needs to be trained to predict the future data pattern.

In an embodiment of this application, an implementation of step S33 may be multiplying the matrix $U_1$, the matrix $D_1$, and the second matrix $\hat{V}$ to obtain a future data matrix $\hat{Y}$ of M objects, that is, $$\hat{Y} = U_1 D_1 \hat{V} \tag{8}.$$

The following formula can be obtained according to formula (8) and the foregoing matrices $U_1$, $D_1$, and $\hat{V}$ $$\begin{bmatrix} y_{1,T+1} & y_{1,T+2} & \cdots & y_{1,T+H} \\ y_{2,T+1} & y_{2,T+2} & \cdots & y_{2,T+H} \\ \vdots & \vdots & \ddots & \vdots \\ y_{M,T+1} & y_{M,T+2} & \cdots & y_{M,T+H} \end{bmatrix} = \begin{bmatrix} u_{11} & u_{12} & \cdots & u_{1L} \\ u_{21} & u_{22} & \cdots & u_{2L} \\ \vdots & \vdots & \ddots & \vdots \\ u_{M1} & u_{M2} & \cdots & u_{ML} \end{bmatrix}$$

$$\begin{bmatrix} d_{11} & 0 & \cdots & 0 \\ 0 & d_{22} & \cdots & 0 \\ \vdots & \vdots & \ddots & \vdots \\ 0 & 0 & \cdots & d_{LL} \end{bmatrix} \begin{bmatrix} \hat{v}_{1,t+1} & \hat{v}_{1,T+2} & \cdots & \hat{v}_{1,T+H} \\ \hat{v}_{2,T+1} & \hat{v}_{2,T+2} & \cdots & \hat{v}_{2,T+H} \\ \vdots & \vdots & \ddots & \vdots \\ \hat{v}_{L,T+1} & \hat{v}_{L,T+2} & \cdots & \hat{v}_{L,T+H} \end{bmatrix},$$

where the future data matrix is as follows $$\hat{Y} = \begin{bmatrix} y_{1,T+1} & y_{1,T+2} & \cdots & y_{1,T+H} \\ y_{2,T+1} & y_{2,T+2} & \cdots & y_{2,T+H} \\ \vdots & \vdots & \ddots & \vdots \\ y_{m,T+1} & y_{m,T+2} & \cdots & y_{m,T+H} \end{bmatrix}.$$

In the future data matrix $\hat{Y}$, a future data sequence of an object i may be expressed as $\hat{y}_i[y_{i,T+1}\ y_{i,T+2} \cdots y_{i,T+H}]$.

It should be noted that, when $L=T$, $\hat{Y}=U_1 D_1 \hat{V}$. For details, refer to the foregoing related descriptions. Details are not described again in this embodiment of this application.

It should also be noted that H may be equal to 1, and a future data sequence may include only one piece of data.

It should be understood that the computing device or the prediction module can predict a future data sequence of an object in any one or more prediction object classes of the K prediction object classes.

Actual order data of a plurality of products of a company is used as a training set to predict a future demand of the products. An experimental result shows that compared with the other approaches shown in FIG. 1 or prediction using an ARIMA model, the data sequence prediction method of this application can increase a prediction accuracy rate and an order fulfillment rate by about 7% and 5%, respectively.

Prediction consistency is used to measure a proportion of orders that are fulfilled within a period of time. The prediction consistency may be expressed as $$P_{conherence} = \frac{\sum_{k=1}^{Q} I_i}{N}.$$

When an order i is fulfilled, $I_i=1$. Q is a total quantity of orders.

Prediction accuracy measures how close a predicted future data sequence is to a real data sequence within a period of time. The prediction accuracy may be expressed as $$P_{veracity} = \frac{1}{n}\sum_{k=1}^{m} \frac{\min(y_i, \hat{y}_i)}{\max(y_i, \hat{y}_i)},$$

where n is a quantity of codes.

In another approach to a data prediction system, it is assumed that there is a fixed product hierarchical structure between the plurality of products such that a predicted value is disassembled or adjusted based on the fixed product hierarchical structure, to ensure prediction consistency between the products. When there is a non-fixed product hierarchical structure between the plurality of products, the foregoing data prediction method cannot ensure prediction consistency between the products.

In this embodiment of this application, the computing device calculates, based on the historical data sequences of the N objects, the similarity distance between every two objects of the N objects, to obtain the similarity distance set, where the similarity distance is used to represent a similarity degree of two objects, divides the N objects into the K prediction object classes based on the similarity distance set using the clustering algorithm, and predicts the future data sequence of the object included in the at least one prediction object class of the K prediction object classes. When this embodiment of the present disclosure is implemented, a prediction object class is automatically defined using the clustering algorithm, which is efficient and more accurate.

Moreover, during prediction of future data sequences of objects in a same prediction object class, a historical data pattern is extracted, a future data pattern is predicted, and a future data sequence is restored based on the future data pattern. This improves consistency and accuracy of data sequence prediction.

The following describes an apparatus in the embodiments of this application.

Figure 10:
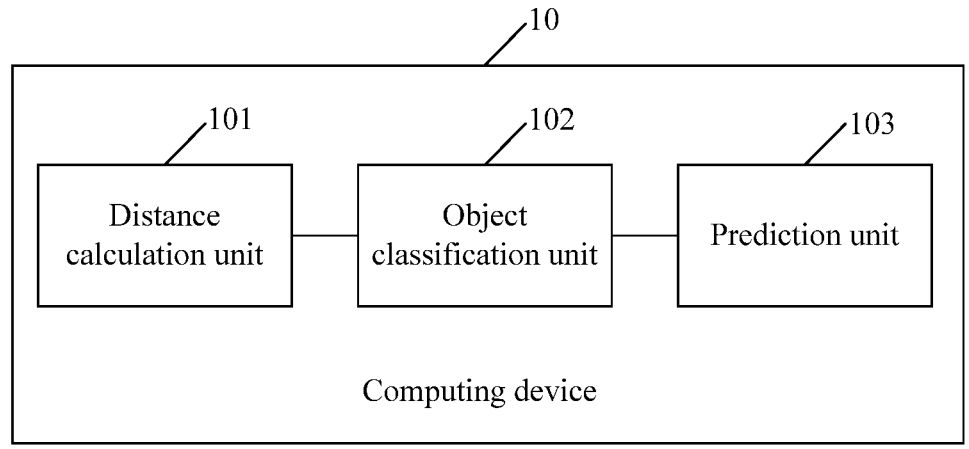
FIG. 10 is a schematic structural diagram of a computing device according to an embodiment of this application.

FIG. 10 is a schematic structural diagram of a computing device according to an embodiment of the present disclosure. The computing device 10 may include a distance calculation unit 101 configured to calculate, based on historical data sequences of N objects, a similarity distance between every two objects of the N objects, to obtain a similarity distance set, where the similarity distance is used to represent a similarity degree of two objects, the historical data sequence includes a plurality of pieces of data arranged according to a preset rule, and N is a positive integer greater than 1, an object classification unit 102 configured to divide the N objects into K prediction object classes based on the similarity distance set using a clustering algorithm, where K is a positive integer, and K≤N, and a prediction unit 103 configured to predict a future data sequence of an object included in at least one prediction object class of the K prediction object classes.

In an embodiment of this application, the distance calculation unit 101 is further configured to calculate, based on the historical data sequences of the N objects, a data similarity distance between every two objects of the N objects, where the data similarity distance is used to represent a similarity degree between historical data sequences corresponding to two objects, calculate a layer similarity distance between every two objects of the N objects, where the layer similarity distance is used to represent a similarity degree between layers of two objects in a hierarchical structure, and obtain, based on the data similarity distance and the layer similarity distance between every two objects of the N objects, the similarity distance set, where any similarity distance in the similarity distance set includes a corresponding data similarity distance and a corresponding layer similarity distance.

In an embodiment of this application, an object i and an object j are any two objects in the N objects, and a similarity distance between the object i and the object j is calculated using the following formula $$d(y_i, y_j) = \frac{2d_{cor}(y_j, y_j)}{1 + e^{-d_{dis}(y_i, y_j)}},$$

where $y_i$ is a historical data sequence of the object i, $y_j$ is a historical data sequence of the object j, $d_{cor}(y_i, y_j)$ is a data similarity distance between the object i and the object j, and $d_{dis}(y_i, y_j)$ is a layer similarity distance between the object i and the object j.

Optionally, a calculation formula of $d_{cor}(y_i, y_j)$ is $$d_{cor}(y_i, y_j) = \sqrt{2(1 - Cor(y_i, y_j))},$$

where $$Cor(y_i, y_j) = \frac{\sum_{t=1}^{Q} (y_{it} - \overline{y}_i)(y_{jt} - \overline{y}_j)}{\sqrt{\sum_{t=1}^{Q} (y_{it} - \overline{y}_i)^2} \sqrt{\sum_{t=1}^{Q} (y_{jt} - \overline{y}_j)^2}},$$

where $Cor(y_i, y_j)$ is a Pearson correlation value of the object i and the object j, $y_{it}$ is a $t^{th}$ piece of data in the historical data sequence of the object i, and $y_{jt}$ is a $t^{th}$ piece of data in the historical data sequence of the object j, where t is a positive integer, $t \leq Q$, and Q is a quantity of pieces of data included in the historical data sequence of the object i, and is a positive integer.

Optionally, a hierarchical structure of the N objects is a tree structure, where $d_{dis}(y_i, y_j)$ is a difference between a layer to which a node position of the object i belongs in the tree structure and a layer to which a node position of the object j belongs in the tree structure.

In an embodiment of this application, a first prediction object class is any prediction object class of the at least one prediction object class, and that the prediction unit 103 is configured to predict a future data sequence of an object included in the first prediction object class includes calculating, based on a historical data sequence of the object included in the first prediction object class, historical common data patterns of the first prediction object class, where the historical common data pattern of the first prediction object class is used to represent a common feature included in historical data sequences of all objects in the first prediction object class, predicting, based on the historical common data patterns of the first prediction object class, a future data pattern of the first prediction object class, and predicting, based on the future data pattern of the first prediction object class and the historical data sequence of the object included in the first prediction object class, the future data sequence of the object included in the first prediction object class.

In an embodiment of this application, the first prediction object class includes M objects, where $M \leq N$, M is a positive integer, a historical data sequence of each of the M objects includes T pieces of data, and T is a positive integer greater than 1, and the calculating, by the prediction unit 103 based on a historical data sequence of the object included in the first prediction object class, historical common data patterns of the first prediction object class includes performing singular value decomposition on an M×T matrix of historical data sequences of the M objects, to obtain a T×T first matrix, where an inverse matrix of the first matrix is an orthogonal matrix, and data in each row of the first matrix constitutes a historical data pattern, and extracting, from the first matrix, a first historical data pattern to an $L^{th}$ historical data pattern as the historical common data patterns of the first prediction object class, where L is a positive integer, and $L \leq T$.

In an embodiment of this application, a future data sequence of each of the M objects includes H pieces of data, where H is a positive integer, and the predicting, by the prediction unit 103 based on the historical common data patterns of the first prediction object class, a future data pattern of the first prediction object class includes obtaining H data pattern models through training based on the historical common data patterns of the first prediction object class, where a $k^{th}$ data pattern model in the H data pattern models is used to predict data in a $k^{th}$ column of a second matrix $\hat{V}$ of the future data pattern of the first prediction object class, k is a positive integer, $k \leq H$, and the future data pattern of the first prediction object class is used to represent a common feature included in future data sequences of all objects in the first prediction object class, inputting data in a $T^{th}$ column to a $(T-p+1)^{th}$ column in a third matrix $V_1$ of the historical common data patterns of the first prediction object class into the $k^{th}$ data pattern model in the H data pattern models, to predict the data in the $k^{th}$ column of the second matrix $\hat{V}$, where p is a positive integer, $1 < p < T$, and each row of the third matrix $V_1$ constitutes a historical common data pattern, and combining data predicted using the H data pattern models, to obtain the second matrix $\hat{V}$, where data in each row of the second matrix $\hat{V}$ constitutes a future data pattern.

In an embodiment of this application, a future data sequence of each of the M objects includes H pieces of data, where H is a positive integer, and the predicting, by the prediction unit 103 based on the historical common data patterns of the first prediction object class, a future data pattern of the first prediction object class includes obtaining a data pattern model through training based on the historical common data patterns of the first prediction object class, inputting data in a $(T-H+k)^{th}$ column to a $(T-H+k-p+1)^{th}$ column in a third matrix $V_1$ of the historical common data patterns of the first prediction object class into the data pattern model, to predict data in a $k^{th}$ column of a second matrix $\hat{V}$ of the future data pattern of the first prediction object class, where k and p are positive integers, $k \leq H$, and $T-H+k-p \geq 1$, each row of the third matrix $V_1$ constitutes a historical common data pattern, and the future data pattern of the first prediction object class is used to represent a common feature included in future data sequences of all objects in the first prediction object class, and combining data predicted by sequentially setting k=1 to H, to obtain the second matrix $\hat{V}$, where data in each row of the second matrix $\hat{V}$ constitutes a future data pattern.

In an embodiment of this application, the prediction unit 103 is configured to perform singular value decomposition on the M×T matrix of the historical data sequences of the M objects, to further obtain an M×M fourth matrix U and an M×T fifth matrix D, where the fourth matrix U is an orthogonal matrix, and the fifth matrix D is a diagonal matrix, and the predicting, by the prediction unit 103 based on the future data pattern of the first prediction object class and the historical data sequence of the object included in the first prediction object class, the future data sequence of the object included in the first prediction object class further includes $\hat{Y}=U_1 D_1 \hat{V}$, where $\hat{Y}$ is a matrix of the future data sequence of the object included in the first prediction object class, $U_1$ is a matrix of data in a first column to an $L^{th}$ column of the fourth matrix U, and $D_1$ is a matrix of data in a first column to an $L^{th}$ column of a first row to an $L^{th}$ row of the fifth matrix D.

In an embodiment of this application, a value on a diagonal of the fifth matrix D acting as a diagonal matrix decreases as a quantity of rows increases, and L may be a quantity of elements in the fifth matrix D that are greater than a preset threshold in order to reduce computational complexity by reducing a quantity of historical data patterns.

It should be noted that for implementation of each unit, reference may be made to corresponding descriptions of the method embodiments, and details are not described again in this embodiment of this application.

Figure 11:
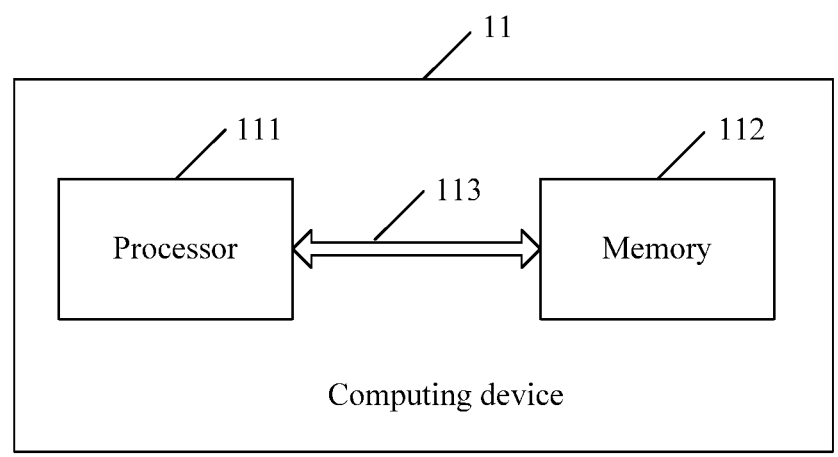
FIG. 11 is a schematic structural diagram of another computing device according to an embodiment of this application.

FIG. 11 is a schematic structural diagram of another computing device according to an embodiment of this application. The computing device 11 includes a processor 111 and a memory 112. The processor 111 is connected to the memory 112 using a bus 113.

The memory 112 may include a read-only memory (ROM) and a random access memory (RAM), and provide an instruction and data to the processor 111. A part of the memory 112 may further include a non-volatile random access memory (NVRAM).

Optionally, the computing device 11 may further include at least one communications interface, where the communications interface is configured to implement data exchange between the computing device 11 and a terminal, a server, another computing device, or the like.

The processor 111 may be a central processing unit (CPU), or the processor 111 may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, or the processor may be any conventional processor or the like.

The processor 111 is configured to call the program code stored in the memory 112 to calculate, based on historical data sequences of N objects, a similarity distance between every two objects of the N objects, to obtain a similarity distance set, where the similarity distance is used to represent a similarity degree of two objects, the historical data sequence includes a plurality of pieces of data arranged according to a preset rule, and N is a positive integer greater than 1, divide the N objects into K prediction object classes based on the similarity distance set using a clustering algorithm, where K is a positive integer, and K≤N, and predict a future data sequence of an object included in at least one prediction object class of the K prediction object classes.

In an embodiment of this application, the calculating, by the processor 111 based on historical data sequences of N objects, a similarity distance between every two objects of the N objects, to obtain a similarity distance set includes calculating, based on the historical data sequences of the N objects, a data similarity distance between every two objects of the N objects, where the data similarity distance is used to represent a similarity degree between historical data sequences corresponding to two objects, calculating a layer similarity distance between every two objects of the N objects, where the layer similarity distance is used to represent a similarity degree between layers of two objects in a hierarchical structure, and obtaining, based on the data similarity distance and the layer similarity distance between every two objects of the N objects, the similarity distance set, where any similarity distance in the similarity distance set includes a corresponding data similarity distance and a corresponding layer similarity distance.

In an embodiment of this application, an object i and an object j are any two objects in the N objects, and a similarity distance between the object i and the object j is calculated using the following formula $$d(y_j, y_j) = \frac{2 d_{cor}(y_j, y_j)}{1 + e^{-d_{dis}(y_i, y_j)}},$$

where $y_i$ is a historical data sequence of the object i, $y_j$ is a historical data sequence of the object j, $d_{cor}(y_i, y_j)$ is a data similarity distance between the object i and the object j, and $d_{dis}(y_i, y_j)$ is a layer similarity distance between the object i and the object j.

In an embodiment of this application, a calculation formula of $d_{cor}(y_i, y_j)$ is $$d_{cor}(y_i, y_j) = \sqrt{2(1 - Cor(y_i, y_j))},$$

where $$Cor(y_i, y_j) = \frac{\sum_{k=1}^{Q} (y_{it} - \overline{y}_i)(y_{jt} - \overline{y}_j)}{\sqrt{\sum_{k=1}^{Q} (y_{it} - \overline{y}_i)^2} \sqrt{\sum_{k=1}^{Q} (y_{jt} - \overline{y}_j)^2}},$$

where $Cor(y_i, y_j)$ is a Pearson correlation value of the object i and the object j, $y_{it}$ is a $t^{th}$ piece of data in the historical data sequence of the object i, and $y_{jt}$ is a $t^{th}$ piece of data in the historical data sequence of the object j, where t is a positive integer, t≤Q, and Q is a quantity of pieces of data included in the historical data sequence of the object i, and is a positive integer.

In an embodiment of this application, a hierarchical structure of the N objects is a tree structure, where $d_{dis}(y_i, y_j)$ is a difference between a layer to which a node position of the object i belongs in the tree structure and a layer to which a node position of the object j belongs in the tree structure.

In an embodiment of this application, a first prediction object class is any prediction object class of the at least one prediction object class, and the predicting, by the processor 111, a future data sequence of an object included in the first prediction object class includes calculating, based on a historical data sequence of the object included in the first prediction object class, historical common data patterns of the first prediction object class, where the historical common data pattern of the first prediction object class is used to represent a common feature included in historical data sequences of all objects in the first prediction object class, predicting, based on the historical common data patterns of the first prediction object class, a future data pattern of the first prediction object class, and predicting, based on the future data pattern of the first prediction object class and the historical data sequence of the object included in the first prediction object class, the future data sequence of the object included in the first prediction object class.

In an embodiment of this application, the first prediction object class includes M objects, where M≤N, M is a positive integer, a historical data sequence of each of the M objects includes T pieces of data, and T is a positive integer greater than 1, and the calculating, by the processor 111 based on a historical data sequence of the object included in the first prediction object class, historical common data patterns of the first prediction object class includes performing singular value decomposition on an M×T matrix of historical data sequences of the M objects, to obtain a T×T first matrix, where an inverse matrix of the first matrix is an orthogonal matrix, and data in each row of the first matrix constitutes a historical data pattern, and extracting, from the first matrix, a first historical data pattern to an $L^{th}$ historical data pattern as the historical common data patterns of the first prediction object class, where L is a positive integer, and L≤T.

In an embodiment of this application, a future data sequence of each of the M objects includes H pieces of data, where H is a positive integer, and the predicting, by the processor 111 based on the historical common data patterns of the first prediction object class, a future data pattern of the first prediction object class includes obtaining H data pattern models through training based on the historical common data patterns of the first prediction object class, where a $k^{th}$ data pattern model in the H data pattern models is used to predict data in a $k^{th}$ column of a second matrix $\hat{V}$ of the future data pattern of the first prediction object class, k is a positive integer, k≤H, and the future data pattern of the first prediction object class is used to represent a common feature included in future data sequences of all objects in the first prediction object class, inputting data in a $T^{th}$ column to a $(T-p+1)^{th}$ column in a third matrix $V_1$ of the historical common data patterns of the first prediction object class into the $k^{th}$ data pattern model in the H data pattern models, to predict the data in the $k^{th}$ column of the second matrix $\hat{V}$, where p is a positive integer, 1<p<T, and each row of the third matrix $V_1$ constitutes a historical common data pattern, and combining data predicted using the H data pattern models, to obtain the second matrix $\hat{V}$, where data in each row of the second matrix $\hat{V}$ constitutes a future data pattern.

In an embodiment of this application, a future data sequence of each of the M objects includes H pieces of data, where H is a positive integer, and the predicting, by the processor 111 based on the historical common data patterns of the first prediction object class, a future data pattern of the first prediction object class includes obtaining a data pattern model through training based on the historical common data patterns of the first prediction object class, inputting data in a $(T-H+k)^{th}$ column to a $(T-H+k-p+1)^{th}$ column in a third matrix $V_1$ of the historical common data patterns of the first prediction object class into the data pattern model, to predict data in a $k^{th}$ column of a second matrix $\hat{V}$ of the future data pattern of the first prediction object class, where k and p are positive integers, k≤H, and T−H+k−p≥1, each row of the third matrix $V_1$ constitutes a historical common data pattern, and the future data pattern of the first prediction object class is used to represent a common feature included in future data sequences of all objects in the first prediction object class, and combining data predicted by sequentially setting k=1 to H, to obtain the second matrix $\hat{V}$, where data in each row of the second matrix $\hat{V}$ constitutes a future data pattern.

In an embodiment of this application, the processor 111 performs singular value decomposition on the M×T matrix of the historical data sequences of the M objects, to further obtain an M×M fourth matrix U and an M×T fifth matrix D, where the fourth matrix U is an orthogonal matrix, and the fifth matrix D is a diagonal matrix, and the predicting, based on the future data pattern of the first prediction object class and the historical data sequence of the object included in the first prediction object class, the future data sequence of the object included in the first prediction object class further includes $\hat{Y}=U_1 D_1 \hat{V}$, where $\hat{Y}$ is a matrix of the future data sequence of the object included in the first prediction object class, $U_1$ is a matrix of data in a first column to an $L^{th}$ column of the fourth matrix U, and $D_1$ is a matrix of data in a first column to an $L^{th}$ column of a first row to an $L^{th}$ row of the fifth matrix D.

In an embodiment of this application, a value on a diagonal of the fifth matrix D acting as a diagonal matrix decreases as a quantity of rows increases, and L may be a quantity of elements in the fifth matrix D that are greater than a preset threshold in order to reduce computational complexity by reducing a quantity of historical data patterns.

It should be noted that for implementation of each unit, reference may be made to corresponding descriptions of the method embodiments, and details are not described again in this embodiment of this application.

In summary, in this embodiment of this application, the similarity distance between every two objects of the N objects is calculated based on the historical data sequences of the N objects, to obtain the similarity distance set, where the similarity distance is used to represent a similarity degree of two objects, the N objects are divided into the K prediction object classes based on the similarity distance set using the clustering algorithm, and the future data sequence of the object included in the at least one prediction object class of the K prediction object classes is predicted. When this embodiment of the present disclosure is implemented, a prediction object class is automatically defined using the clustering algorithm, which is efficient and more accurate.

Moreover, during prediction of future data sequences of objects in a same prediction object class, a historical data pattern is extracted, a future data pattern is predicted, and a future data sequence is restored based on the future data pattern. This improves consistency and accuracy of data sequence prediction.

Persons of ordinary skill in the art may understand that all or some of the processes of the methods in the embodiments may be implemented by a computer program instructing relevant hardware. The program may be stored in a computer readable storage medium. When the program is executed, the processes of the methods in the embodiments are performed. The foregoing storage medium may include a magnetic disk, an optical disc, a ROM, or a RAM.

A sequence of the steps of the method in the embodiments of the present disclosure may be adjusted, and some steps may also be combined or removed according to an actual requirement.

The modules in the apparatus in the embodiments of the present disclosure may be combined, divided, or deleted according to an actual requirement.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A data sequence prediction method implemented by a processor of a computing device, comprising:
  receiving, from a server through a communication interface coupled to the processor, a first plurality of historical data sequences of N objects;
  obtaining, based on the first historical data sequences, a similarity distance between every two objects of the N objects and obtaining a similarity distance set, wherein the similarity distance represents a first similarity degree between every two objects, wherein each of the first historical data sequences comprises a plurality of pieces of data arranged according to a preset rule, and wherein N is a positive integer greater than 1;
  dividing the N objects into K prediction object classes based on the similarity distance set and using a clustering algorithm, wherein K is a positive integer, and wherein K≤N;
  obtaining, based on a historical data sequence of an object of the N objects comprised in a prediction object class of the K prediction object classes, historical common data patterns of the prediction object class;
  training a model based on the historical common data patterns of the prediction object class to obtain a data pattern model;
  predicting a future data sequence of the object using the data pattern model; and
  sending, through the communication interface, the future data sequence from the computing device to the server.

2. The data sequence prediction method of claim 1, wherein obtaining the similarity distance between every two objects of the N objects comprises:
  obtaining, based on the first historical data sequences of the N objects, a data similarity distance between every two objects of the N objects, wherein the data similarity distance represents a second similarity degree between the first historical data sequences corresponding to every two objects;
  obtaining a layer similarity distance between every two objects of the N objects, wherein the layer similarity distance represents a third similarity degree between layers of every two objects in a hierarchical structure; and
  obtaining, based on the data similarity distance and the layer similarity distance, the similarity distance set, wherein the similarity distance in the similarity distance set comprises a corresponding data similarity distance and a corresponding layer similarity distance.

3. The data sequence prediction method of claim 2, wherein a first object i and a second object j are the two objects in the N objects, wherein the similarity distance between the first object i and the second object j is obtained using the following formula:

$$d(y_i, y_j) = \frac{2d_{cor}(y_i, y_j)}{1 + e^{-d_{dis}(y_i, y_j)}},$$

wherein $y_i$ is a first historical data sequence of the first object i, wherein $y_j$ is a second historical data sequence of the second object j, wherein $d_{cor}(y_i, y_j)$ is the data similarity distance between the first object i and the second object j, and wherein $d_{dis}(y_i, y_j)$ is the layer similarity distance between the first object i and the second object j.

4. The data sequence prediction method of claim 3, wherein the data similarity distance is obtained using the following formula:

$$d_{cor}(y_i, y_j) = \sqrt{2(1 - Cor(y_i, y_j))},$$

wherein $$Cor(y_i, y_j) = \frac{\sum_{t=1}^{Q} (y_{it} - \overline{y}_i)(y_{jt} - \overline{y}_j)}{\sqrt{\sum_{t=1}^{Q} (y_{it} - \overline{y}_i)^2} \sqrt{\sum_{t=1}^{Q} (y_{jt} - \overline{y}_j)^2}},$$

wherein $Cor(y_i, y_j)$ is a pearson correlation value of the first object i and the second object j, wherein $y_{it}$ is a $t^{th}$ piece of data in the first historical data sequence, wherein $y_{jt}$ is a $t^{th}$ piece of data in the second historical data sequence, wherein t is a positive integer, wherein t≤Q, and wherein Q is a quantity of pieces of the data in the first historical data sequence and is a positive integer.

5. The data sequence prediction method of claim 3, wherein the hierarchical structure of the N objects is a tree structure, and wherein the layer similarity distance is a difference between a first layer to which a first node position of the first object i belongs in the tree structure and a second layer to which a second node position of the second object j belongs in the tree structure.

6. The data sequence prediction method of claim 1, wherein predicting the future data sequence of the object comprised in the prediction object class comprises:
  obtaining, based on the historical data sequence, the historical common data patterns, wherein the historical common data pattern represents a common feature comprised in a second plurality of historical data sequences of all objects in the prediction object class;
  predicting, based on the historical common data patterns of the prediction object class, a future data pattern of the prediction object class; and
  predicting, based on the future data pattern of the prediction object class and the historical data sequence of the object comprised in the prediction object class, the future data sequence of the object comprised in the prediction object class.

7. The data sequence prediction method of claim 6, wherein the prediction object class comprises M objects, wherein M≤N, wherein M is a positive integer, wherein a historical data sequence of each of the M objects comprises T pieces of data, wherein T is a positive integer greater than 1, and wherein obtaining the historical common data patterns of the prediction object class comprises:
  performing singular value decomposition on an M×T first matrix of a third plurality of historical data sequences of the M objects to obtain a T×T second matrix, wherein an inverse matrix of the second matrix is an orthogonal matrix, and wherein data in each row of the second matrix constitutes a historical data pattern; and
  extracting, from the second matrix, a first historical data pattern to an $L^{th}$ historical data pattern as the historical common data patterns of the prediction object class, wherein L is a positive integer, and wherein L≤T.

8. The data sequence prediction method of claim 7, wherein a future data sequence of each of the M objects comprises H pieces of data, wherein H is a positive integer, and wherein predicting the future data pattern of the prediction object class comprises:
- obtaining H data pattern models from training based on the historical common data patterns of the prediction object class, wherein a $k^{th}$ data pattern model in the H data pattern models predicts data in a $k^{th}$ column of a third matrix $\hat{V}$ of the future data pattern of the prediction object class, wherein k is a positive integer, wherein k≤H, and wherein the future data pattern of the prediction object class represents a common feature comprised in future data sequences of all objects in the prediction object class;
- inputting data in a $T^{th}$ column to a $(T-p+1)^{th}$ column in a fourth matrix V1 of the historical common data patterns of the prediction object class into the $k^{th}$ data pattern model in the H data pattern models to predict the data in the $k^{th}$ column of the third matrix $\hat{V}$, wherein p is a positive integer, wherein 1<p<T, and wherein each row of the fourth matrix V1 constitutes a historical common data pattern; and
- combining data predicted using the H data pattern models to obtain the third matrix $\hat{V}$, wherein data in each row of the third matrix $\hat{V}$ constitutes a future data pattern.

9. The data sequence prediction method of claim 8, further comprising performing singular value decomposition on the M×T first matrix to further obtain a M×M fifth matrix U and a M×T sixth matrix D, wherein the fifth matrix U is an orthogonal matrix, and the sixth matrix D is a diagonal matrix, wherein the future data sequence of the object comprised in the prediction object class is obtained using the following formula:

$$\hat{Y} = U_1 D_1 \hat{V},$$

wherein $\hat{Y}$ is the future data sequence of the object comprised in the prediction object class, wherein U1 is a matrix of data in a first column to an $L^{th}$ column of the fifth matrix U, and wherein D1 is a matrix of data in a first column to an $L^{th}$ column of a first row of an $L^{th}$ row of the sixth matrix D.

10. The data sequence prediction method of claim 7, wherein a future data sequence of each of the M objects comprises H pieces of data, wherein H is a positive integer, and wherein predicting the future data pattern of the prediction object class comprises:
- inputting data in a $(T-H+k)^{th}$ column to a $(T-H+k-p+1)^{th}$ column in a fourth matrix V1 of the historical common data patterns of the prediction object class into the data pattern model to predict data in a $k^{th}$ column of a third matrix $\hat{V}$ of the future data pattern of the prediction object class, wherein k and p are positive integers, wherein k≤H, wherein T−H+k−p≥1, wherein each row of the fourth matrix V1 constitutes a historical common data pattern, and wherein the future data pattern of the prediction object class represents a common feature comprised in future data sequences of all objects in the prediction object class; and
- combining data predicted by sequentially setting k=1 to a quantity of data pattern models H, to obtain the third matrix $\hat{V}$, wherein data in each row of the third matrix $\hat{V}$ constitutes a future data pattern.

11. A computing device, comprising:
- a processor; and
- a memory coupled to the processor and configured to store instructions that, when executed by the processor, cause the computing device to be configured to:
  - receive, from a server through a communication interface coupled to the processor, a first plurality of historical data sequences of N objects;
  - obtain, based on the first historical data sequences, a similarity distance between every two objects of the N objects and obtain a similarity distance set, wherein the similarity distance represents a first similarity degree of between every two objects, wherein each of the first historical data sequences comprises a plurality of pieces of data arranged according to a preset rule, and wherein N is a positive integer greater than 1;
  - divide the N objects into K prediction object classes based on the similarity distance set using a clustering algorithm, wherein K is a positive integer, and wherein K≤N;
  - obtain, based on a historical data sequence of an object comprised in a prediction object class of the K prediction object classes, historical common data patterns of the prediction object class;
  - train a model based on the historical common data patterns of the prediction object class to obtain a data pattern model;
  - predict a future data sequence of the object using the data pattern model; and
  - send, through the communication interface, the future data sequence to the server.

12. The computing device of claim 11, wherein the instructions further cause the computing device to be configured to:
- obtain a data similarity distance between every two objects of the N objects based on the first historical data sequences of the N objects, wherein the data similarity distance represents a second similarity degree between first historical data sequences corresponding to every two objects;
- obtain a layer similarity distance between every two objects of the objects, wherein the layer similarity distance represents a third similarity degree between layers of every two objects in a hierarchical structure; and
- obtain, based on the data similarity distance and the layer similarity distance, the similarity distance set, wherein the similarity distance in the similarity distance set comprises a corresponding data similarity distance and a corresponding layer similarity distance.

13. The computing device of claim 12, wherein a first object i and a second object j are the two objects in the N objects, and wherein the similarity distance between the first object i and the second object j is obtained using the following formula:

$$d(y_i, y_j) = \frac{2 d_{cor}(y_i, y_j)}{1 + e^{-d_{dis}(y_i, y_j)}},$$

wherein $y_i$ is a first historical data sequence of the first object i, wherein $y_j$ is a second historical data sequence of the second object j, wherein $d_{cor}(y_i, y_j)$ is the data similarity distance between the first object i and the second object j, and wherein $d_{dis}(y_i, y_j)$ is the layer similarity distance between the first object i and the second object j.

14. The computing device of claim 13, wherein the data similarity distance is obtained using the following formula:

$$d_{cor}(y_i, y_j) = \sqrt{2(1 - Cor(y_i, y_j))},$$

wherein $$Cor(y_i, y_j) = \frac{\sum_{t=1}^{Q} (y_{it} - \overline{y}_i)(y_{jt} - \overline{y}_j)}{\sqrt{\sum_{t=1}^{Q} (y_{it} - \overline{y}_i)^2} \sqrt{\sum_{t=1}^{Q} (y_{jt} - \overline{y}_j)^2}},$$

wherein $Cor(y_i, y_j)$ is a pearson correlation value of the first object i and the second object j, wherein $y_{it}$ is a $t^{th}$ piece of data in the first historical data sequence, wherein $y_{jt}$ is a $t^{th}$ piece of data in the second historical data sequence, wherein t is a positive integer, wherein t≤Q, and wherein Q is a quantity of pieces of the data in the first historical data sequence and is a positive integer.

15. The computing device of claim 13, wherein the hierarchical structure of the N objects is a tree structure, and wherein the layer similarity distance is a difference between a first layer to which a first node position of the first object i belongs in the tree structure and a second layer to which a second node position of the second object j belongs in the tree structure.

16. The computing device of claim 11, wherein the instructions further cause the computing device to be configured to:
obtain the historical common data patterns, wherein the historical common data pattern of the prediction object class represents a common feature comprised in a second plurality of historical data sequences of all objects in the prediction object class;
predict a future data pattern of the prediction object class based on the historical common data patterns of the prediction object class; and
predict the future data sequence of the object comprised in the prediction object class based on the future data pattern of the prediction object class and the historical data sequence of the object comprised in the prediction object class.

17. The computing device of claim 16, wherein the prediction object class comprises M objects, wherein M≤N, wherein M is a positive integer, wherein a historical data sequence of each of the M objects comprises T pieces of data, wherein T is a positive integer greater than 1, and wherein the instructions further cause the computing device to be configured to:
perform singular value decomposition on an M×T first matrix of a third plurality of historical data sequences of the M objects to obtain a T×T second matrix, wherein an inverse matrix of the second matrix is an orthogonal matrix, and wherein data in each row of the second matrix constitutes a historical data pattern; and
extract, from the second matrix, a first historical data pattern to an $L^{th}$ historical data pattern as the historical common data patterns of the prediction object class, wherein L is a positive integer, and wherein L≤T.

18. The computing device of claim 17, wherein a future data sequence of each of the M objects comprises H pieces of data, wherein H is a positive integer, and wherein the instructions further cause the computing device to be configured to:
obtain H data pattern models from training based on the historical common data patterns of the prediction object class, wherein a $k^{th}$ data pattern model in the H data pattern models predicts data in a $k^{th}$ column of a third matrix $\hat{V}$ of the future data pattern of the prediction object class, wherein k is a positive integer, wherein k≤H, and wherein the future data pattern of the prediction object class represents a common feature comprised in future data sequences of all objects in the prediction object class;
input data in a $T^{th}$ column to a $(T-p+1)^{th}$ column in a fourth matrix V1 of the historical common data patterns of the prediction object class into the $k^{th}$ data pattern model in the H data pattern models, to predict the data in the $k^{th}$ column of the third matrix $\hat{V}$, wherein p is a positive integer, wherein 1<p<T, and wherein each row of the fourth matrix V1 constitutes a historical common data pattern; and
combine data predicted using the H data pattern models to obtain the third matrix $\hat{V}$, wherein data in each row of the second matrix $\hat{V}$ constitutes a future data pattern.

19. The computing device of claim 17, wherein a future data sequence of each of the M objects comprises H pieces of data, wherein H is a positive integer, and wherein the instructions further cause the computing device to be configured to:
input data in a $(T-H+k)^{th}$ column to a $(T-H+k-p+1)^{th}$ column in a fourth matrix V1 of the historical common data patterns of the prediction object class into the data pattern model to predict data in a $k^{th}$ column of a third matrix $\hat{V}$ of the future data pattern of the prediction object class, wherein k and p are positive integers, wherein k≤H, and wherein T−H+k−p≥1, wherein each row of the fourth matrix V1 constitutes a historical common data pattern, and wherein the future data pattern of the prediction object class represents a common feature comprised in future data sequences of all objects in the prediction object class; and
combine data predicted by sequentially setting k=1 to H to obtain the third matrix $\hat{V}$, wherein data in each row of the third matrix $\hat{V}$ constitutes a future data pattern.

20. A computer program product comprising computer-executable instructions for storage on a non-transitory computer-readable medium that, when executed by a processor, cause an information processing apparatus to:
receive, from a server through a communication interface coupled to the processor, a first plurality of historical data sequences of N objects;
obtain a similarity distance between every two objects of a plurality of objects and obtain a similarity distance set based on historical data sequences of N objects, wherein the similarity distance represents a first similarity degree between every two objects, wherein each of the historical data sequences comprises a plurality of pieces of data arranged according to a preset rule;
divide the N objects into a plurality of prediction object classes based on the similarity distance set using a clustering algorithm;
obtain, based on a historical data sequence of an object comprised in a prediction object class of the prediction object classes, historical common data patterns of the prediction object class;
train a model based on the historical common data patterns of the prediction object class to obtain a data pattern model;
predict a future data sequence of the object using the data pattern model; and
send, through the communication interface, the future data sequence to the server.

* * * * *

UNITED STATES PATENT AND TRADEMARK OFFICE
CERTIFICATE OF CORRECTION

PATENT NO.         : 12,223,398 B2
APPLICATION NO.    : 17/038635
DATED              : February 11, 2025
INVENTOR(S)        : Xinjie Chen et al.

Page 1 of 1

It is certified that error appears in the above-identified patent and that said Letters Patent is hereby corrected as shown below:

In the Claims

Claim 13, Column 36, Line 53: "$2d_{corr}(y_j, y_j)$" should read ""$2d_{corr}(y_i, y_j)$"

Claim 13, Column 36, Line 54: "$d(y_j, y_j)=$" should read "$d(y_i, y_j)=$"

Signed and Sealed this
Eighth Day of April, 2025

Coke Morgan Stewart
*Acting Director of the United States Patent and Trademark Office*